United States Patent
Applebourn et al.

(10) Patent No.: US 11,544,416 B2
(45) Date of Patent: Jan. 3, 2023

(54) SYSTEM AND METHOD FOR SECURING A COMPUTER SYSTEM FROM THREATS INTRODUCED BY USB DEVICES

(71) Applicant: CYBER SEPIO SYSTEMS LTD, Tel Aviv (IL)

(72) Inventors: Yosef Applebourn, Potomac, MD (US); Iftah Bratspiess, Tel-Aviv (IL); Bentsi Ben-Atar, Ness Ziona (IL)

(73) Assignee: CYBER SEPIO SYSTEMS LTD, Tel Aviv (IL)

( * ) Notice: Subject to any disclaimer, the term of this patent is extended or adjusted under 35 U.S.C. 154(b) by 183 days.

(21) Appl. No.: 16/633,860

(22) PCT Filed: Aug. 1, 2018

(86) PCT No.: PCT/IL2018/050857
§ 371 (c)(1),
(2) Date: Jan. 24, 2020

(87) PCT Pub. No.: WO2019/030748
PCT Pub. Date: Feb. 14, 2019

(65) Prior Publication Data
US 2020/0226298 A1    Jul. 16, 2020

(30) Foreign Application Priority Data

Aug. 3, 2017   (IL) .......................................... 253823
Sep. 18, 2017  (IL) .......................................... 254573

(51) Int. Cl.
*G06F 21/85*    (2013.01)
*G06F 21/55*    (2013.01)
(Continued)

(52) U.S. Cl.
CPC ............ *G06F 21/85* (2013.01); *G06F 21/552* (2013.01); *G06F 21/577* (2013.01); *G06F 21/73* (2013.01)

(58) Field of Classification Search
CPC ...... G06F 21/85; G06F 21/552; G06F 21/577; G06F 21/73; G06F 21/606; G06F 21/572; G06F 21/57; G06F 21/71
(Continued)

(56) References Cited

U.S. PATENT DOCUMENTS 7,877,788 B1 *   1/2011   Topp ...................... G06F 21/85
                                                         726/4
7,899,753 B1     3/2011   Everhart
(Continued)

FOREIGN PATENT DOCUMENTS

WO   2017/046789 A1   3/2017
WO   2017/158593 A1   9/2017

OTHER PUBLICATIONS

Daley, Brandon L. Usbesafe: Applying one class svm for effective usb event anomaly detection. Northeastern University, College of Computer and Information Systems Boston United States, Apr. 25, 2016. (Year: 2016).*
(Continued)

*Primary Examiner* — Lynn D Feild
*Assistant Examiner* — Ethan V Vo
(74) *Attorney, Agent, or Firm* — Oliff PLC

(57) ABSTRACT

A system for preventing attacks on at least one computer via its USB port, the system comprising at least one processor configured to monitor at least one aspect of a connection between a peripheral and a computer's USB port, to identify aspects which match pre-configured criteria and responsively, to take action.

26 Claims, 15 Drawing Sheets

(51) Int. Cl.
*G06F 21/57* (2013.01)
*G06F 21/73* (2013.01)

(58) Field of Classification Search
USPC ........................................ 726/23, 24, 25, 26
See application file for complete search history.

(56) References Cited

U.S. PATENT DOCUMENTS

| | | | |
|---|---|---|---|
| 8,230,149 | B1 | 7/2012 | Long et al. |
| 8,745,755 | B2 | 6/2014 | Borzycki et al. |
| 8,844,041 | B1 | 9/2014 | Kienzle et al. |
| 9,104,889 | B1 | 8/2015 | Kiswani et al. |
| 9,386,024 | B1 * | 7/2016 | Zaitsev ................... G06F 21/85 |
| 9,785,771 | B1 * | 10/2017 | Pratt ..................... G06F 21/554 |
| 10,078,125 | B2 | 9/2018 | Newman et al. |
| 2001/0032295 | A1 | 10/2001 | Tsai et al. |
| 2002/0034273 | A1 | 3/2002 | Spence et al. |
| 2002/0141332 | A1 | 10/2002 | Barnard et al. |
| 2003/0172318 | A1 | 9/2003 | Sugita et al. |
| 2004/0044807 | A1 | 3/2004 | Wang et al. |
| 2005/0114697 | A1 | 5/2005 | Cornell et al. |
| 2006/0242424 | A1 | 10/2006 | Kitchens et al. |
| 2007/0006282 | A1 | 1/2007 | Durham et al. |
| 2009/0002085 | A1 | 1/2009 | Tarng et al. |
| 2009/0161924 | A1 | 6/2009 | Lu et al. |
| 2010/0161927 | A1 * | 6/2010 | Sprouse ................... G06F 21/79 711/163 |
| 2010/0268053 | A1 | 10/2010 | Ghesquiere et al. |
| 2011/0173315 | A1 | 7/2011 | Aguren |
| 2011/0302397 | A1 | 12/2011 | Mitola, III |
| 2012/0151102 | A1 | 6/2012 | Cheng et al. |
| 2012/0311207 | A1 | 12/2012 | Powers et al. |
| 2013/0031629 | A1 | 1/2013 | Srivastava et al. |
| 2013/0167254 | A1 * | 6/2013 | Gyllenskog ......... G06F 21/6209 726/30 |
| 2013/0318607 | A1 | 11/2013 | Reed et al. |
| 2013/0347103 | A1 | 12/2013 | Veteikis et al. |
| 2014/0108792 | A1 | 4/2014 | Borzycki et al. |
| 2014/0215637 | A1 * | 7/2014 | Moore ..................... G06F 21/71 726/27 |
| 2014/0337558 | A1 * | 11/2014 | Powers ................... G06F 13/42 710/313 |
| 2014/0344930 | A1 | 11/2014 | Foley |
| 2015/0067866 | A1 * | 3/2015 | Ibatullin ............. H04L 63/0209 726/25 |
| 2015/0262067 | A1 * | 9/2015 | Sridhara ............. H04W 12/128 706/12 |
| 2015/0302377 | A1 | 10/2015 | Sweitzer et al. |
| 2015/0365237 | A1 | 12/2015 | Soffer |
| 2016/0080195 | A1 | 3/2016 | Ramachandran et al. |
| 2016/0094574 | A1 | 3/2016 | Hsueh et al. |
| 2016/0117503 | A1 | 4/2016 | Reed et al. |
| 2016/0349308 | A1 | 12/2016 | Zhang et al. |
| 2016/0373408 | A1 | 12/2016 | Wentworth et al. |
| 2018/0324179 | A1 * | 11/2018 | Hou ....................... G06F 21/51 |
| 2019/0312839 | A1 | 10/2019 | Grimm et al. |

OTHER PUBLICATIONS

"USB in a Nutshell;" Chapter 1—Making sense of the USB standard; Jul. 4, 2017; pp. 1-5; https://www.beyondlogic.org/usbnutshell/usb1.shtml.

"Payloads;" May 2, 2019; pp. 1-3; https://github.com/hak5darren/USB-Rubber-Ducky/wiki/Payloads.

Nitroz; "How to: Using Cisco Cable Diagnostics;" Jan. 28, 2013; pp. 1-4; https://community.spiceworks.com/how_to/24277-using-cisco-cable-diagnostics.

"General Documentation for Ethernet PHY registers;" Microchip; Mar. 10, 2017; pp. 1-3; http://www.microchip.com/forums/m979258.aspx.

Margaret Rouse; "network access control (NAC);" SearchNetworking; Aug. 15, 2017; pp. 1-5; http://searchnetworking.techtarget.com/definition/network-access-control.

Ralf Neuhaus; "A Beginner's Guide to Ethernet 802.3;" Engineer-to-Engineer Note; EE-269; Jun. 6, 2005; pp. 1-26; http://www.analog.com/media/en/technical-documentation/application-notes/EE-269.pdf.

"Autonegotiation;" Wikipedia; Aug. 30, 2017; pp. 1-3; https://en.wikipedia.org/wiki/Autonegotiation.

"Media-independent interface;" Wikipedia; Aug. 4, 2017; pp. 1-7; https://en.wikipedia.org/wiki/Media-independent_interface.

"Anomaly detection;" Wikipedia; Jul. 7, 2017; pp. 1-5; https://en.wikipedia.org/wiki/Anomaly_detection.

Zimek et al.; "Outlier Detection;" Encyclopedia of Database Systems; Springer Science+Business Media LLC; New York; 2017; pp. 1-5.

Hodge et al.; "A Survey of Outlier Detection Methodologies;" Artificial Intelligence Review, 22 (2); 2004; pp. 85-126.

Dokas et al.; "Data Mining for Network Intrusion Detection;" In Proc. NSF Workshop on Next Generation Data Mining; Computer Science Department; University of Minnesota; Nov. 2002; pp. 21-30.

Dargin; "Increase your network security: Deploy a honeypot;" NetworkWorld; Oct. 24, 2017; pp. 1-8; https://www.networkworld.com/article/3234692/increase-your-network-security-deploy-a-honeypot.html.

"Cisco Identity Services Engine;" pp. 1-9; https://www.cisco.com/c/en/us/products/security/identity-services-engine/index.html.

"A New Way to Look at Network Access Control;" Jul. 4, 2017; pp. 1-4; https://www.forescout.com/solutions/network-access-control/.

U.S. Appl. No. 16/078,052, filed Aug. 21, 2018 in the name of Yosef Appleboum et al.

U.S. Appl. No. 16/647,556, filed Mar. 16, 2020 in the name of Iftah Bratspiess et al.

"NetXtreme® / NetLink™ BCM5718 Family Programmer's Guide;" Broadcom Corporation; Jul. 17, 2013; pp. 267-268; https://docs.broadcom.com/docs/1211168564147.

Aug. 16, 2018 "Cisco Identity Services Engine;" pp. 1-9; https://www.cisco.com/c/en/us/products/security/identity-services-engine/index.html.

* cited by examiner

Fig. 6

| Offset | Field | Size | Value | Description |
|---|---|---|---|---|
| 0 | bLength | 1 | Number | Size of the Descriptor in Bytes (18 bytes) |
| 1 | bDescriptorType | 1 | Constant | Device Descriptor (0x01) |
| 2 | bcdUSB | 2 | BCD | USB Specification Number which device complies too. |
| 4 | bDeviceClass | 1 | Class | Class Code (Assigned by USB Org) If equal to Zero, each interface specifies its own class code If equal to 0xFF, the class code is vendor specified. Otherwise field is valid Class Code. |
| 5 | bDeviceSubClass | 1 | SubClass | Subclass Code (Assigned by USB Org) |
| 6 | bDeviceProtocol | 1 | Protocol | Protocol Code (Assigned by USB Org) |
| 7 | bMaxPacketSize | 1 | Number | Maximum Packet Size for Zero Endpoint. Valid Sizes are 8, 16, 32, 64 |
| 8 | idVendor | 2 | ID | Vendor ID (Assigned by USB Org) |
| 10 | idProduct | 2 | ID | Product ID (Assigned by Manufacturer) |
| 12 | bcdDevice | 2 | BCD | Device Release Number |
| 14 | iManufacturer | 1 | Index | Index of Manufacturer String Descriptor |
| 15 | iProduct | 1 | Index | Index of Product String Descriptor |
| 16 | iSerialNumber | 1 | Index | Index of Serial Number String Descriptor |
| 17 | bNumConfigurations | 1 | Integer | Number of Possible Configurations |

Fig. 7

| Offset | Field | Size | Value | Description |
|---|---|---|---|---|
| 0 | bLength | 1 | Number | Size of Descriptor in Bytes |
| 1 | bDescriptorType | 1 | Constant | Configuration Descriptor (0x02) |
| 2 | wTotalLength | 2 | Number | Total length in bytes of data returned |
| 4 | bNumInterfaces | 1 | Number | Number of Interfaces |
| 5 | bConfigurationValue | 1 | Number | Value to use as an argument to select this configuration |
| 6 | iConfiguration | 1 | Index | Index of String Descriptor describing this configuration |
| 7 | bmAttributes | 1 | Bitmap | D7 Reserved, set to 1. (USB 1.0 Bus Powered) D6 Self Powered D5 Remote Wakeup D4..0 Reserved, set to 0. |
| 8 | bMaxPower | 1 | mA | Maximum Power Consumption in 2mA units |

Fig. 8

| Offset | Field | Size | Value | Description |
|---|---|---|---|---|
| 0 | bLength | 1 | Number | Size of Descriptor in Bytes (9 Bytes) |
| 1 | bDescriptorType | 1 | Constant | Interface Descriptor (0x04) |
| 2 | bInterfaceNumber | 1 | Number | Number of Interface |
| 3 | bAlternateSetting | 1 | Number | Value used to select alternative setting |
| 4 | bNumEndpoints | 1 | Number | Number of Endpoints used for this interface |
| 5 | bInterfaceClass | 1 | Class | Class Code (Assigned by USB Org) |
| 6 | bInterfaceSubClass | 1 | SubClass | Subclass Code (Assigned by USB Org) |
| 7 | bInterfaceProtocol | 1 | Protocol | Protocol Code (Assigned by USB Org) |
| 8 | iInterface | 1 | Index | Index of String Descriptor Describing this interface |

Fig. 9

| Offset | Field | Size | Value | Description |
|---|---|---|---|---|
| 0 | bLength | 1 | Number | Size of Descriptor in Bytes (7 bytes) |
| 1 | bDescriptorType | 1 | Constant | Endpoint Descriptor (0x05) |
| 2 | bEndpointAddress | 1 | Endpoint | Endpoint Address<br>Bits 0..3b Endpoint Number.<br>Bits 4..6b Reserved. Set to Zero<br>Bits 7 Direction 0 = Out, 1 = In (Ignored for Control Endpoints) |
| 3 | bmAttributes | 1 | Bitmap | Bits 0..1 Transfer Type<br>00 = Control<br>01 = Isochronous<br>10 = Bulk<br>11 = Interrupt<br>Bits 2..7 are reserved. If Isochronous endpoint,<br>Bits 3..2 = Synchronisation Type (Iso Mode)<br>00 = No Synchronisation<br>01 = Asynchronous<br>10 = Adaptive<br>11 = Synchronous<br>Bits 5..4 = Usage Type (Iso Mode)<br>00 = Data Endpoint<br>01 = Feedback Endpoint<br>10 = Explicit Feedback Data Endpoint<br>11 = Reserved |
| 4 | wMaxPacketSize | 2 | Number | Maximum Packet Size this endpoint is capable of sending or receiving |
| 6 | bInterval | 1 | Number | Interval for polling endpoint data transfers. Value in frame counts. Ignored for Bulk & Control Endpoints. Isochronous must equal 1 and field may range from 1 to 255 for interrupt endpoints. |

Fig. 10

| 0 | bLength | 1 | Number | Size of Descriptor in Bytes |
|---|---|---|---|---|
| 1 | bDescriptorType | 1 | Constant | String Descriptor (0x03) |
| 2 | wLANGID[0] | 2 | number | Supported Language Code Zero (e.g. 0x0409 English - United States) |
| 4 | wLANGID[1] | 2 | number | Supported Language Code One (e.g. 0x0c09 English - Australian) |
| n | wLANGID[x] | 2 | number | Supported Language Code x (e.g. 0x0407 German - Standard) |

Fig. 11a

| Source IP | Destination IP | Protocol | Source Port | Destination Port |
|---|---|---|---|---|
| PC IP address | localhost | TCP | Any | 9075 |

Fig. 11b

| Source IP | Destination IP | Protocol | Source Port | Destination Port |
|---|---|---|---|---|
| PC IP address | SepioConsole IP | TCP | Any | 9076 |

Fig. 11c

| Source IP | Destination IP | Protocol | Source Port | Destination Port |
|---|---|---|---|---|
| SepioConsole IP | PC IP address | TCP | Any | 9078 |

Fig. 12a

| Facility | |
|---|---|
| 0 | kernel messages |
| 1 | user-level messages |
| 2 | mail system |
| 3 | system daemons |
| 4 | security/authorization messages |
| 5 | messages generated internally by |
| 6 | line printer subsystem |
| 7 | network news subsystem |
| 8 | UUCP subsystem |
| 9 | clock daemon |
| 10 | security/authorization messages |
| 11 | FTP daemon |
| 12 | NTP subsystem |
| 13 | log audit |
| 14 | log alert |
| 15 | clock daemon |
| 16-23 | locally used facilities (local0-local7) |

Fig. 12b

| Severity | |
|---|---|
| 0 | Emergency: system is unusable |
| 1 | Alert: action must be taken |
| 2 | Critical: critical conditions |
| 3 | Error: error conditions |
| 4 | Warning: warning conditions |
| 5 | Notice: normal but significant |
| 6 | Informational: informational messages |
| 7 | Debug: debug-level messages |

Fig. 13a

| Standard Keys | | |
|---|---|---|
| act | String (length 63) | Action mentioned in the event |
| app | String (length 31) | Application level protocol, examples are: HTTP, HTTPS |
| cnt | Integer | A count associated with this event |
| dvc | IPv4 (length 16) | Identifies the device that an event refers to |
| deviceMacAddress | | Six colon-separated hexadecimal numbers. Example: "00:0D:60:AF:1B:61" |
| shost | String (length 1023) | Identifies the source that an event refers to |
| msg | String (length 1023) | An arbitrary message giving more details about the event |
| deviceInboundInterface | String (length 15) | Interface on which the packet or data entered the device |
| start | TimeStamp | The time when the activity the event referred to started. The format is MMM dd yyyy HH:mm:ss |
| end | TimeStamp | The time at which the activity related to the event ended |

Fig. 13b

| Sepio Specific Keys | | |
|---|---|---|
| sepioSysUuid | String (length 63) | Unique identifier of Sepio entity (agent instance etc.) |
| sepioSysAgentVer | String (length 31) | Software version of SepioService |
| sepioSysUsbVid | String (length 4) | Vendor identifier of a specific USB device or interface |
| sepioSysUsbPid | String (length 4) | Product identifier of a specific USB device or interface |
| sepioSysUsbSn | String (length 63) | Serial number of a specific USB device or interface |
| sepioSysUsbClass | Integer | Device class of a specific USB interface |
| sepioSysUsbSubclass | Integer | Device subclass of a specific USB interface |
| sepioSysUsbProtocol | Integer | Device protocol of a specific USB interface |

Fig. 14a

| Syslog Priority | Informational (6) |
|---|---|
| CEF Signature ID | 0x100001 |
| CEF Severity | 1 |
| Free Text / Name | New Sepio agent associated |
| Extensions | dvc=" 192.168.11.6" shost="NY-FIN-R-L-76" sepioSysUuid="BFEBFBFF0806E9L1HF74D0048" sepioSysAgentVer="1.84.02" |
| Syslog Example | <86>New Sepio agent associated, dvc=192.168.11.6 shost=NY-FIN-R-L-76 sepioSysUuid=BFEBFBFF0806E9L1HF74D0048 sepioSysAgentVer=1.84.02 |
| CEF Example | CEF:0\|SepioSystems\|SepioPrime\|2.1.9.0\|0x100001^ew Sepio agent associated\|1\| dvc=192.168.11.6 shost=NY-FIN-R-L-76 sepioSysUuid=BFEBFBFF0806E9L1HF74D0048 sepioSysAgentVer=1.84.02 |

Fig. 14b

| Syslog Priority | Notice (5) |
|---|---|
| CEF Signature ID | 0x100002 |
| CEF Severity | 1 |
| Free Text / Name | Sepio agent connected |
| Extensions | dvc=" 192.168.11.6" shost="NY-FIN-R-L-76" |
| Syslog Example | <85>Sepio agent connected, dvc=192.168.11.6 shost=NY-FIN-R-L-76 |
| CEF Example | CEF:0\|SepioSystems\|SepioPrime\|2.1.9.0\|0x100002^epio agent connected\|1\| dvc=192.168.11.6 shost=NY-FIN-R-L-76 |

Fig. 14c

| Syslog Priority | Notice (5) |
|---|---|
| CEF Signature ID | 0x100003 |
| CEF Severity | 2 |
| Free Text / Name | Sepio agent disconnected |
| Extensions | dvc="192.168.11.6" shost="NY-FIN-R-L-76" |
| Syslog Example | *<85>Sepio agent disconnected, dvc=192.168.11.6 shost=NY-FIN-R-L-76* |
| CEF Example | *CEF:0\|SepioSystems\|SepioPrime\|2.1.9.0\| 0x100003\|Sepio agent disconnected\|2\| dvc=192.168.11.6 shost=NY-FIN-R-L-76* |

Fig. 15a

| Syslog Priority | Warning (4) |
|---|---|
| CEF Signature ID | 0x100004 |
| CEF Severity | 5 |
| Free Text / Name | Agent mode changed to Free |
| Extensions | dvc=" 192.168.11.6" shost="NY-FIN-R-L-76" |
| Syslog Example | *<84> Agent mode changed to Free, dvc=192.168.11.6 shost=NY-FIN-R-L-76* |
| CEF Example | *CEF:0\|Sep^oSystems\|Sep^oPr^me\|2.1.9.0\| 0x100004^gent mode changed to Free\|5\| dvc=192.168.11.6 shost=NY-FIN-R-L-76* |

Fig. 15b

| Syslog Priority | Warning (4) |
|---|---|
| CEF Signature ID | 0x100005 |
| CEF Severity | 5 |
| Free Text / Name | Agent mode changed to Armed |
| Extensions | dvc=" 192.168.11.6" shost="NY-FIN-R-L-76" |
| Syslog Example | *<84> Agent mode changed to Armed, dvc=192.168.11.6 shost=NY-FIN-R-L-76* |
| CEF Example | *CEF:0\|Sep^oSystems\|Sep^oPr^me\|2.1.9.0\| 0x100005^gent mode changed to Armed\|5\| dvc=192.168.11.6 shost=NY-FIN-R-L-76* |

Fig. 15c

| Syslog Priority | Warning (4) |
|---|---|
| CEF Signature ID | 0x100006 |
| CEF Severity | 5 |
| Free Text / Name | Agent peripherals approved |
| Extensions | dvc=" 192.168.11.6" shost="NY-FIN-R-L-76" |
| Syslog Example | *<84> Agent peripherals approved, dvc=192.168.11.6 shost=NY-FIN-R-L-76* |

Fig. 16a

| Syslog Priority | Warning (4) |
|---|---|
| CEF Signature ID | 0x110001 |
| CEF Severity | 5 |
| Free Text / Name | New USB peripheral detected |
| Extensions | dvc=" 192.168.11.6" shost="NY-FIN-R-L-76" sepioSysUsbVid="046D" sepioSysUsbPid="C077" |
| Syslog Example | *<84> New USB peripheral detected, dvc=192.168.11.6 shost=NY-FIN-R-L-76 sepioSysUsbVid=046D sepioSysUsbPid=C077* |
| CEF Example | *CEF:0\|SepioSystems\|SepioPrime\|2.1.9.0\| 0x110001\|New USB peripheral detected\|5\| dvc=192.168.11.6 shost=NY-FIN-R-L-76 sepioSysUsbVid=046D sepioSysUsbPid=C077* |

Fig. 16b

| Syslog Priority | Informational (6) |
|---|---|
| CEF Signature ID | 0x110002 |
| CEF Severity | 3 |
| Free Text / Name | USB peripheral connected |
| Extensions | dvc=" 192.168.11.6" shost="NY-FIN-R-L-76" sepioSysUsbVid="046D" sepioSysUsbPid="C077" |
| Syslog Example | *<8 6>USB peripheral connected, dvc=192.168.11.6 shost=NY-FIN-R-L-76 sepioSysUsbVid=04 6D sepioSysUsbPid=C0 77* |
| CEF Example | *CEF:0\|SepioSystems\|SepioPrime\|2.1.9.0\| 0x110002\|usb peripheral connected\|3\| dvc=192.168.11.6 shost=NY-FIN-R-L-76 sepioSysUsbVid=04 6D sepioSysUsbPid=C0 77* |

Fig. 16c

| Syslog Priority | Notice (5) |
|---|---|
| CEF Signature ID | 0x110003 |
| CEF Severity | 3 |
| Free Text / Name | USB peripheral disconnected |
| Extensions | dvc="192.168.11.6" shost="NY-FIN-R-L-76" sepioSysUsbVid="046D" sepioSysUsbPid="C077" |
| Syslog Example | *<85>USB peripheral disconnected, dvc=192.168.11.6 shost=NY-FIN-R-L-76 sepioSysUsbVid=046D sepioSysUsbPid=C077* |
| CEF Example | *CEF:0\|SepioSystems\|SepioPrime\|2.1.9.0\| 0x110003\|USB peripheral disconnected\|3\| dvc=192.168.11.6 shost=NY-FIN-R-L-76 sepioSysUsbVid=046D sepioSysUsbPid=C077* |

Fig. 17a

| Syslog Priority | Informational (6) |
|---|---|
| CEF Signature ID | 0x110004 |
| CEF Severity | 4 |
| Free Text / Name | USB peripheral approved |
| Extensions | dvc=" 192.168.11.6" shost="NY-FIN-R-L-76" sepioSysUsbVid="046D" sepioSysUsbPid="C077" |
| Syslog Example | <8 6>USB peripheral approved, dvc=192.168.11.6 shost=NY-FIN-R-L-76 sepioSysUsbVid=04 6D sepioSysUsbPid=C0 77 |
| CEF Example | CEF:0\|SepioSystems\|SepioPrime\|2.1.9.0\| 0x110004\| USB peripheral approved\| 4\| dvc=192.168.11.6 shost=NY-FIN-R-L-76 sepioSysUsbVid=04 6D sepioSysUsbPid=C0 77 |

Fig. 17b

| Syslog Priority | Informational (6) |
|---|---|
| CEF Signature ID | 0x110005 |
| CEF Severity | 4 |
| Free Text / Name | USB peripheral disapproved |
| Extensions | dvc=" 192.168.11.6" shost="NY-FIN-R-L-76" sepioSysUsbVid="046D" sepioSysUsbPid="C077" |
| Syslog Example | <8 6>USB peripheral disapproved, dvc=192.168.11.6 shost=NY-FIN-R-L-76 sepioSysUsbVid=04 6D sepioSysUsbPid=C0 77 |
| CEF Example | CEF:0\|SepioSystems\|SepioPrime\|2.1.9.0\| 0x110005^SB peripheral disapproved\|4\| dvc=192.168.11.6 shost=NY-FIN-R-L-76 sepioSysUsbVid=04 6D sepioSysUsbPid=C0 77 |

Fig. 18a

| Syslog Priority | Informational (6) |
|---|---|
| CEF Signature ID | 0x110006 |
| CEF Severity | 4 |
| Free Text / Name | USB peripheral enabled |
| Extensions | dvc=" 192.168.11.6" shost="NY-FIN-R-L-76" sepioSysUsbVid="046D" sepioSysUsbPid="C077" |
| Syslog Example | <8 6>USB peripheral enabled, dvc=192.168.11.6 shost=NY-FIN-R-L-76 sepioSysUsbVid=04 6D sepioSysUsbPid=C0 77 |
| CEF Example | CEF:0\|Sep^oSystems\|Sep^oPr^me\|2.1.9.0\| 0x110006^SB peripheral enabled\|4\| dvc=192.168.11.6 shost=NY-FIN-R-L-76 sepioSysUsbVid=04 6D sepioSysUsbPid=C0 77 |

Fig. 18b

| Syslog Priority | Warning (4) |
|---|---|
| CEF Signature ID | 0x110007 |
| CEF Severity | 5 |
| Free Text / Name | USB peripheral disabled |
| Extensions | dvc=" 192.168.11.6" shost="NY-FIN-R-L-76" sepioSysUsbVid="046D" sepioSysUsbPid="C077" |
| Syslog Example | <86>USB peripheral disabled, dvc=192.168.11.6 shost=NY-FIN-R-L-76 sepioSysUsbVid=04 6D sepioSysUsbPid=C0 77 |
| CEF Example | CEF:0\|Sep^oSystems\|Sep^oPr^me\|2.1.9.0\| 0x110007^SB peripheral disabled\|5\| dvc=192.168.11.6 shost=NY-FIN-R-L-76 sepioSysUsbVid=04 6D sepioSysUsbPid=C0 77 |

SYSTEM AND METHOD FOR SECURING A COMPUTER SYSTEM FROM THREATS INTRODUCED BY USB DEVICES

REFERENCE TO CO-PENDING APPLICATIONS

Priority is claimed from Israel patent application no. 253823, filed Mar. 8, 2017 and entitled " . . . Securing A Computer System From threats introduced by USB Devices", and Israel patent application no. 254573 filed 18 Sep. 2017 and entitled " . . . For Securing a Local Area Network From threats introduced by Rogue or Malicious Devices", the disclosure of which application/s is hereby incorporated by reference.

FIELD OF THIS DISCLOSURE

The present invention relates generally to computerized systems and more particularly to security for computerized systems.

BACKGROUND FOR THIS DISCLOSURE

All computer systems, and many related products such as communication devices, printers, storage appliances and more, use a USB (Universal Serial Bus) as the main interface for connecting peripheral hardware.

The following http www link: beyondlogic.org/usbnutshell/presents USB in a nutshell for peripheral designers.

A typical server, desktop computer, or laptop will usually have 4 to 6 USB ports that are mostly used for connecting HID products (Human Interface Device) such as a mouse and keyboard, removable media/storage (Disk on Key for example), and other local peripheral hardware devices such as printers, audio input/output/record/playback devices, cameras, scanners etc.

PowerShell is a task automation and configuration management framework from Microsoft, consisting of a command-line shell and associated scripting language. Initially a Windows component only, known as Windows PowerShell, it was made open-source and cross-platform on 18 Aug. 2016 with the introduction of PowerShell Core.

A device driver (e.g. in Microsoft systems) is hardware dependent operating-system-specific software that runs in the operating system kernel hence has access to kernel resources. the driver provides an interface via which operating systems and other computer programs communicate with peripherals e.g. through the computer bus. a calling program invokes a routine in the driver, the driver issues commands to the peripheral or device, the peripheral sends data back to the driver, and the driver may then invoke routines in the calling program.

A system and method, using hardware, for protecting a computer system from USB related vulnerabilities, is described in co-pending WO2017158593A1, entitled "A System, Method and Computer Program Product for Protecting a Computer System From Attacks".

The disclosures of all publications and patent documents mentioned in the specification, and of the publications and patent documents cited therein directly or indirectly, and of the USB standard literature, are hereby incorporated by reference. Materiality of such publications and patent documents to patentability is not conceded.

SUMMARY OF CERTAIN EMBODIMENTS

Being widely used, very generic and an open standard, a USB is heavily targeted as a weak point when trying to attack computer systems.

As a USB can be used to interface practically anything to a computer system, with unlimited ability to "inject" data into the computer and "export" data from the computer, a carefully crafted attack mechanism can be used to take over the computer system, steal information, cause damage, or even allow the computer system to be used as a zombie for further attacking more networks and devices.

USB attacks can take place not only at the personal computer, home, or office use level, but also against entire enterprises, critical infrastructures, or retail environments.

A typical POS (Point of Sale) deployment such as a supermarket or retail chain store will include several active USB connections—for example a keyboard, a barcode scanner, a label printer etc. Each of these can be used for exploiting the system and installation.

USB attacks can start as early as before hitting the site or being installed (e.g. supply chain attacks) or at any later stage e.g. by infecting the existing USB device via the computer or the network.

USB is a combined hardware and software specification and is therefore subject to attacks both on the hardware level where an attacker can "transplant" additional hardware functionality into an innocent device, or only add a hostile piece of code (malware) into the device code and then use it to compromise the computer system.

A typical hardware implant scenario is adding wireless transmission capabilities in a mouse or a keyboard, and practically gaining access to the computer system or being able to transmit sensitive information from the computer (ex-filtrate) without the user being aware of or alerted to any change.

A scenario of a firmware/software attack may result from adding the ability of acting as a storage device to an input device, such as a barcode reader, allowing the input device to transfer files into the computer, and infecting the computer with a virus that will steal all credit card information and transmit them at a later time.

Common practice till now has been to whitelist USB devices according to their VID (Vendor ID) and PID (Product ID). This is unfortunate because devices can have "nested" functionality which differs significantly from the original intended and assumed, or ostensible, functionality. For example, when a USB-Audio Microphone is plugged in, it is expected to provide only audio functionality, while in effect such a device could also impersonate a keyboard or a mouse, capable of injecting malicious commands.

Certain embodiments seek to provide a system for securing organizations against attacks via rogue hardware devices. Enterprises may never suspect that seemingly legitimate USB devices they are using have been compromised, allowing access to key assets. Secured organizations are often relatively protected against cyber-attacks on their networks, applications and data infrastructure e.g. via multilayered security infrastructures that include firewalls, IDS, IPS, email security, endpoint security and more. However, few organizations are focused on peripheral hardware devices which may be misused for penetrating their infrastructure and stealing information. Malicious peripheral devices may be compromised before they are delivered to customers, or tampered with after installation, or even during maintenance and upgrade. It is often impossible to assume existence of control over each subcontractor, supplier, distribution channel and carrier, integrator and installer.

Certain embodiments seek to provide a system that discovers, identifies, and blocks malicious devices before they cause any harm, and protects against all or any subset of:

Infected or malevolent or tampered with or abnormal or malicious or modified USB peripherals (as opposed to formally released or unmodified or normal or benevolent peripherals which cause no threat and do not attack)

Transparent/Invisible network devices

Infrastructure hardware running manipulated firmware

Certain embodiments seek to provide all or any subset of:

Full visibility of all connected devices

Discovery of ghost network devices

Device capabilities and behavior analytics

Alert and block any usage breach or attack attempt

Security grade per device

Cloud-based threat analysis

Certain embodiments seek to provide a data repository of descriptors, interfaces and other aspects associated with peripherals of a given type e.g. Peripherals that share a specific vendor ID and product ID (model number). The data repository typically has this data for many types of peripherals and typically the data repository grows as the system herein encounters new types of peripherals.

Certain embodiments seek to provide USB device control functionality.

Certain embodiments seek to provide analysis of each USB connection on each monitored end station including all or any subset of the following aspects—hardware characteristics, interfaces and behavioral aspects and wherein, typically, upon detection of any suspicious activity at a given USB port, the user (e.g. a system administrator or other designated typically privileged user for a networked organization) is alerted and/or the USB port can be blocked. An example of a suspicious activity is a USB device which ostensibly is of a certain type e.g. a mouse, which acts (e.g. in terms of the interfaces it requests from the end station's operating system) as though it intends to operate (inter alia) as a different type of device (e.g. keyboard).

Certain embodiments seek to provide a system configured for securing organizations against attacks on key computerized assets via rogue hardware devices e.g. by detecting infected or manipulated or rogue or malicious or tampered-with peripherals e.g. by monitoring for altered or malicious device behavior and triggering alerts and/or actually stopping the rogue hardware.

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented as appropriate.

It is appreciated that any reference herein to, or recitation of, an operation being performed is, e.g. If the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. Over a suitable computer network, and used by, server A. Analogously, the remote processor P may not, itself, perform all of the operation, and, instead, the remote processor P itself may receive output/s of portion/s of the operation from yet another processor/s P', may be deployed off-shore relative to P, or "on a cloud", and so forth.

The present invention typically includes at least the following embodiments:

Embodiment 1

A system for preventing attacks on at least one computer via its usb port, the system comprising:

At least one processor configured to monitor at least one aspect of a connection between a peripheral and a computer's usb port, to identify aspects which match pre-configured criteria and responsively, to take action.

Typically the pre-configured criteria are selected to be indicative of situations in which the instance peripheral may be attacking the computer.

Embodiment 2

A system according to Embodiment 1 wherein the at least one processor comprises

A first processor configured to determine the ostensible identity of a peripheral connected to the computer via its usb port; and A second processor configured for comparing at least one aspect of the peripheral's operation with at least one known aspect of a peripheral having the ostensible identity.

It is appreciated that the first and second processors may instead be implemented as software modules on a single physical processor.

Embodiment 3

A system according to any of the preceding embodiments wherein the comparing includes detecting discrepancies between the aspects of the peripheral's operation and the known aspects of a peripheral having the ostensible identity.

Embodiment 4

A system according to any of the preceding embodiments wherein the ostensible identity comprises a vendor id and product id provided by the peripheral to the operating system.

Typically, the peripheral provides the operating system with descriptors, including first and second descriptors respectively indicative of the peripheral's vendor id and product id which the peripheral may provide to the operating system e.g. Via the driver, e.g. As part of the peripheral's handshake with the operating system e.g. Driver.

Embodiment 5

A system according to any of the preceding embodiments wherein the at least one processor is configured to detect inputs injected via the usb port which are pre-defined to be indicative of a risk of an attack on the computer.

Embodiment 6

A system according to any of the preceding embodiments wherein the inputs comprise typed references to utilities pre-defined to be indicative of a risk of an attack on the computer such as powershell, netsh, iexpress.

Embodiment 7

A system according to any of the preceding embodiments wherein, on plural occasions, the action comprises initiating a test thereby to generate test results and, depending on the test's results, taking at least one further action in some of the plural occasions but not others, depending on the test results in each occasion.

For example, the test may comprise sending a challenge e.g. Captcha to the user (if any) of the peripheral connected to the usb port, prompting a human user if any of the peripheral to establish that s/he is a human. This may be done in any occasion which arouses a certain suspicion e.g. Any occasion in which potentially risky commands are identified in an ostensible keyboard's input feed, and then, for at least one occasion in which no indication is received that a human user is present, thereby to suggest that a scripting tool is active in the peripheral connected to the usb port, taking action such as issuing an alert and/or disabling the usb port and for at least one occasion in which an indication is received that a human user is present, thereby to reassure that no scripting tool is active in the peripheral connected to the usb port, taking no such action.

Embodiment 8

A system according to any of the preceding embodiments wherein the at least one aspect comprises at least one hardware aspect.

Embodiment 9

A system according to any of the preceding embodiments wherein the at least one aspect comprises at least one interface aspect.

Embodiment 10

A system according to any of the preceding embodiments wherein the at least one aspect comprises at least one behavioral aspect.

Embodiment 11

A system according to any of the preceding embodiments wherein the action is configurable, via a user interface, by a pre-designated security expert within a computerized network in which the computer is a node.

Embodiment 12

A system according to any of the preceding embodiments wherein the action comprises provision of a notification alert to a pre-designated security expert within a computerized network in which the computer is a node.

Embodiment 13

A system according to any of the preceding embodiments wherein the action comprises automatically disabling the usb port.

Embodiment 14

A system according to any of the preceding embodiments wherein the known aspect comprises descriptors.

The system typically knows (e.g. From the os via the driver) what descriptors the instance peripheral has. Descriptors may vary between devices.

Embodiment 15

A system according to any of the preceding embodiments wherein sets of descriptors characteristic of peripherals having a given make and model number (e.g. Vendor id and product id) are stored by the system.

Embodiment 16

A system according to any of the preceding embodiments wherein at least one set of descriptors stored by the system is characteristic of a peripheral used for penetration testing and wherein the second processor is operative for identifying, as a pre-configured criteria suggestive of attacks, each peripheral whose descriptors correspond to the set of descriptors, stored by the system, which is characteristic of a peripheral used for penetration testing.

Embodiment 17

A system according to any of the preceding embodiments wherein a pre-configured criteria suggestive of attacks includes peripherals whose descriptors do not correspond to any set of descriptors stored by the system.

Embodiment 18

A system according to any of the preceding embodiments wherein the at least one computer comprises plural computers which are nodes in a computerized network serving an organization and wherein the criteria does not include a set of predetermined size of peripherals with identical descriptors, even if those descriptors do not correspond to any set of descriptors stored by the system, thereby to prevent false alarms due to a make and model of peripheral, so new as to be unknown to the system, being adopted by the organization.

Embodiment 19

A method for preventing attacks of a usb-peripheral device on at least one computer, the method comprising:
Storing, in a computer storage data repository, at least one aspect of at least one type of usb peripheral; and
Monitoring a connection between a peripheral instance and a computer's usb port, including using a processor configured for comparing aspects of the connection with the at least one aspect and taking action regarding at least one peripheral instance for which a result of the comparing suggests that the instance peripheral may be (malevolent or) attacking the computer.

For example, criteria may be pre-configured such that results which meet these criteria, statistically and/or logically, are indicative of a high risk, relative to a general population of peripherals, that this peripheral instance is (malevolent or) attacking the computer. This method and any of the methods of embodiments 20 onward below, may be operative in conjunction with any system subject of any of the embodiments 1-18 or otherwise described herein.

Embodiment 20

A system according to any of the preceding embodiments wherein each type of peripheral has a unique vendor id and product id and wherein the data repository stores at least one aspect of plural types of peripherals.

Embodiment 21

A system according to any of the preceding embodiments wherein the aspect stored comprises descriptors characteristic of each type in the data repository and wherein action is taken for at least one instance peripheral which identifies itself as having vendor and product ids characteristic of a type t, then provides the operating system with a descriptor which is not one of the descriptors stored in the data repository for type t.

Embodiment 22

A system according to any of the preceding embodiments wherein the aspect stored comprises interfaces characteristically requested by each type of peripheral in the data repository and wherein action is taken for at least one instance peripheral which identifies itself as having vendor and product ids characteristic of a type t, then requests, from the operating system, an interface which is not one of the interfaces stored in the data repository for type t.

Embodiment 23

A system according to any of the preceding embodiments wherein the at least one computer comprises a population of computers and wherein the method monitors and stores at least one operational parameter of peripherals connected to the population of computers and derives therefrom at least one expected level of the at least one operational parameter for each type of peripheral and wherein action is taken for at least one instance peripheral which identifies itself as having vendor and product ids characteristic of a type t, but at least one of the instance peripheral's operational parameters, when monitored, deviates from the at least one expected level.

Embodiment 24

A system according to any of the preceding embodiments wherein the operational parameter comprises the instant peripheral's current level.

For a given vendor and product id, operational parameters may or may not be uniform irrespective of the operating system. Instances of the peripheral (hp keyboard model xx e.g.) May be compared within the organization and/or globally over organizations.

Cross comparison within a specific vendor is typically used as a "stronger" indication than inter-vendor comparisons, because a comparison within a specific vendor is expected to be more similar.

Example operational parameters may for example include the following (microsoft examples of usb device descriptors):
Bcdusb: 0x0200
Bdeviceclass: 0xef
Bdevicesubclass: 0x02
Bdeviceprotocol: 0x01
Bmaxpacketsize0: 0x40 (64)
Idvendor: 0x045e (microsoft corporation)
Idproduct: 0x0728
Bcddevice: 0x0100
Imanufacturer: 0x01
0x0409: "microsoft"
Iproduct: 0x02
0x0409: "microsoft lifecam vx-5000"
0x0409: "microsoft lifecam vx-5000"
Iserialnumber: 0x00
Bnumconfigurations: 0x01

Embodiment 25

A system according to any of the preceding embodiments wherein the automatically disabling comprises repeatedly sending, from the computer's operating system's kernel space, usb-port-disabling commands, each time period t where t is less than a duty cycle of usb-port enabling commands issued by the operating system's user space.

Embodiment 26

A computer program product, comprising a non-transitory tangible computer readable medium having computer readable program code embodied therein, the computer readable program code adapted to be executed to implement a method for preventing attacks of a usb-peripheral device on at least one computer, the method comprising:

storing, in a computer storage data repository, at least one aspect of at least one type of usb peripheral; and Monitoring a connection between a peripheral instance and a computer's usb port, including using a processor configured for comparing aspects of the connection with the at least one aspect and taking action regarding at least one peripheral instance for which a result of the comparing suggests that the instance peripheral may be (malevolent or) attacking the computer.

Embodiments may also include:

Embodiment I

A system for securing end-users' computers from threats posed by USB devices interacting with the computers, the system including at least one processor configured to provide all or any subset of the following functionalities a-f e.g. any 1 or 2 or 3 or 4 or 5 or all 6 of the following 6 functionalities such as only functionality a or only b or only c or only d or only e or only f.
  a. Capability of determining the TRUE functionality/ies and capability/ies of a USB device and, typically, protecting against at least one true functionalityi/ies and capability/ies deemed to pose a threat to at least one end user's computer.
  b. Better visibility to the organization's assets by basing the system's view on the advertised interfaces of the connected devices.
  c. Content aware protection including identifying specific key words that are commonly used in HID attack scenarios and identifying threats and providing protection, accordingly.
  d. Forensic—back tracking capability to identify the entry point of a specific USB attack tool and providing protection, accordingly.
  e. Device safety level marking—by building a database that holds the detailed specific of each of a multiplicity of USB devices (typically both malicious and non-malicious) encountered by the system, typically cross referenced with publicly available information sources (WWW and dark web) in order to classify and mark the level of risk that the specific device poses.
  f. User profiling—identifying abnormal USB device behavior, e.g. by ML (Machine Learning) based techniques and, typically providing at least one ex-filtration counter measure.

It is appreciated that determining risk marks may include: detection of specific attack-tool "signatures" e.g. as per (e) above, and/or (e.g. as per (f) above) using an ML based algorithm coupled with statistical methods of identification of a potentially malicious device within a group of devices that are supposed to be similar in behavior.

Then, when a risk mark crosses a certain threshold, an alert may be triggered and according to the policy (armed/free) we decide if to block the port or just alert.

It is appreciated that typically, a "fingerprint" includes at least one and typically exactly one vector representing a unique ID for a specific device. A Finger print could be for a legitimate device. However, if a fingerprint is identical to a previously stored attack tool signature, the device is typically identified as a malicious device which may trigger the system.

Typically, a Data Model as used herein includes a set of parameters creating a data structure of various fields (e.g. like the one representing a USB device descriptor), providing a more complete representation of the device than merely a "compiled" vector.

Typically, abnormal USB device behavior comprises a change in functionality and/or a surge of data traffic e.g. to a mass storage device. An abnormal device may also simply comprise a penetration testing device, such as a rubber ducky.

At least one of the following may be derived by analyzing USB configuration interface/s' hardware descriptors:
True functionality/ies and capability/ies of a USB device (as opposed to its ostensible capability and functionality)
Visibility to the organizations asset based on system's view on advertised interfaces of connected devices
Content aware protection
Entry point of at least one specific USB attack tool
Device safety level marking database for a multiplicity of USB devices encountered by the system quantifying a level of risk that each specific device poses;
Abnormal USB device behavior.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or a general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

FIGS. 6-11c, 12a-b, 13a-b, 14a-14c, 15a-c, 16a-c, 16a-c, 17a-b, 18a-b are tables are tables, all or any subset of the rows and columns of which may be provided, which are useful in understanding certain embodiments.

Figure 1:
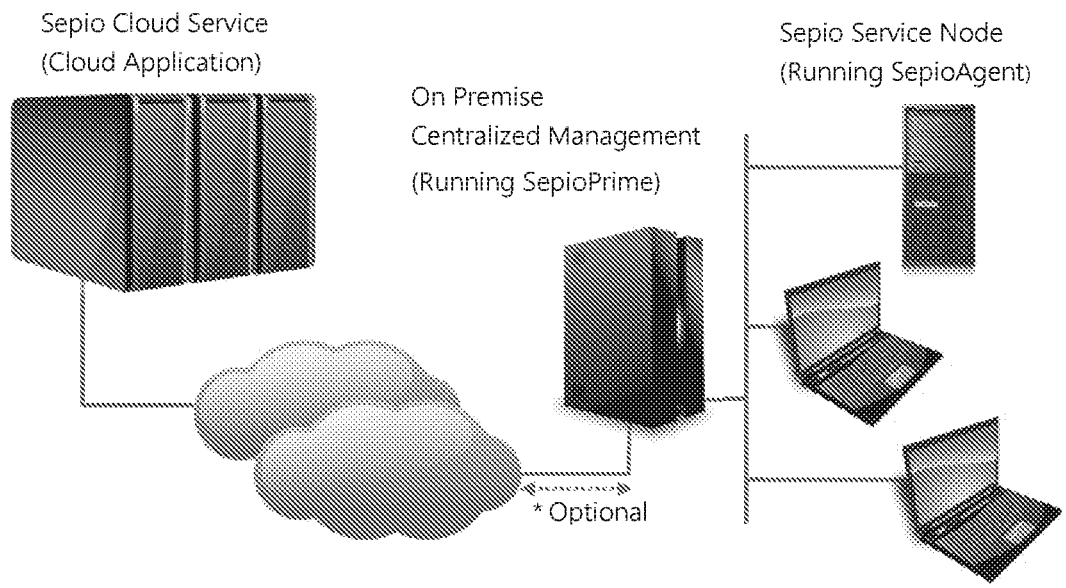
FIGS. 1-5 are simplified semi-pictorial semi-block diagram illustrations of components or elements, all or any subset of which may be provided; the embodiments of FIGS. 1-5 may be provided separately or in any suitable combination and may include all or any subset of the functionalities, operations, components and elements described herein.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices, such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology) or any combination thereof.

Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option, such as but not limited to FPGA, ASIC or DSP, or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line, which is of any type or level or amount or category of volatility, differentiation, mutability, accessibility, addressability, capacity, performance and energy use, and which is based on any suitable technologies such as semiconductor, magnetic, optical, paper and others.

DETAILED DESCRIPTION OF CERTAIN EMBODIMENTS

Typically, the system or USB module shown and described herein is operative to monitor all workstations in a networked organization served by the system, where each workstation may be connected via USB port/s to respective USB peripheral/s aka USB device's thereby to define USB connection/s for each terminal or workstation or end-station or end-unit. If plural instances of the system serve plural networked organizations respectively, a cloud component or element may be provided which centrally learns from all instances of the system and centrally enhances operation of at least one instance of the system, accordingly, e.g. as described herein.

Typically, the system analyzes at least one aspect of each USB connection e.g. the hardware aspect, the interface aspect, and the behavioral aspect.

Logic is defined according to which the system takes action e.g. alerts a suitable destination (e.g. the organization's security and/or IT organization) and/or blocks any USB connection, each time aspect/s of that USB connection are found to be suspicious. Typically, even if only the hardware aspect or only the interface aspect are found to be suspicious, the system is triggered to take action.

For example, in terms of hardware aspects, the system may store descriptors or parameters for each of many known USB devices.

As described herein, risk marks may include detection of specific attack-tool "signatures".

Stored descriptors may include, for example, any of the device, configuration, interface, endpoint, string or other known descriptor.

Each such set of descriptors may serve as a "fingerprint" by which the system identifies that a given peripheral, which has these descriptors, is a USB device of type x, manufacturer y, model z (e.g. an HP printer model such and such, as opposed to a Samsung keyboard model such and such, which has very different descriptors). Typically, the system stores descriptor sets, each including at least one descriptor, for known rogue devices (such as rubber ducky or other devices used for penetration testing) and/or for known legitimate devices (e.g. an HP printer). Typically, if a given USB connection's descriptors match the fingerprint of a known rogue device, this triggers the system and the system may not even bother to compare the descriptor set to known legitimate devices. If a given USB connection's descriptors match the fingerprint of a known legitimate device, this typically prevents the system from triggering. If the descriptors do not match any device known to the system, legitimate or rogue, suitable logic may make a determination. For example, if the unknown descriptor set repeats for many (say at least hundreds) USB devices in the organization, the system may decide the prevalent descriptor set is simply an unknown legitimate USB device (such as a new model of a legitimate USB device), particularly if the descriptor set is similar to known fingerprints. However, if only a few instances of USB devices having an unknown descriptor set are found, the system may be triggered.

It is appreciated that typically, a USB device cannot "fake" its descriptors, since, if it does, the USB device will not be able to function.

Typically, the system may be updated by human engineers who become aware of new models or types of legitimate (or rogue) USB devices and manually add descriptor sets for same e.g. by simply purchasing an instance of the new model or type, or obtaining a data sheet thereof. Alternatively, or in addition, the system may automatically add new models or types of legitimate (or rogue) USB devices to its memory. Typically, this is done only when the ML based algorithm is able to classify a certain USB device as a legitimate non malicious device with a sufficiently high degree or level of confidence.

Alternatively or in addition, hardware aspects may be monitored, and then, algorithmically e.g. via Machine Learning, anomalies in operational parameters may be identified, by comparing a. monitored operational parameters of an instance USB device being monitored, the USB device being of a given type, e.g. as defined by vendor and/or product id by which peripherals may identify their (ostensible) make & model to the o/s as part of their handshake, to b. population norms of the same type (e.g. vendor and/or product ID) or of a similar type (e.g. same manufacturer or vendor, different model or product) which the system has accumulated. For example, the population of HP printers model such and such may be found, e.g. by machine learning, to have a maximal current level which, statistically, is never exceeded. If a USB device which has been identified as HP printer model such and such is monitored and is found to have a higher current level, this may trigger the system.

Alternatively or in addition, in terms of interface aspects, if a peripheral identifies itself to the operating system of the workstation as a mouse (requiring a mouse interface), then later (e.g. responsive to an external event or a timer) identifies itself (also) as a keyboard requiring a keyboard interface (e.g. which receives from the peripheral keystrokes rather than (just) movements), this typically constitutes a trigger because it is likely that the peripheral is operating in this manner in order to run a malicious script. Or, if an input device (e.g. keyboard) which does not have remote capabilities, requests from the operating system a remote interface, this may constitute a trigger because this may be a rogue input device attempting to pave the way for a rogue user to input rogue commands into the system, from afar. It is appreciated that wireless keyboards may include an integrally formed radio transmitter and a separate radio receiver which plugs into the USB port; however non-wireless keyboards lack this hardware hence lack remote capabilities and the system may accumulate meta-data indicating whether each type of input device does or does not have remote capabilities, may recognize an input device's type e.g. by its descriptor set, and may then determine whether this input device's request for a remote interface is legitimate or not. The differentiation with regards to an Android/iOS based device may be similar to that of a "standard" device; e.g. on top of USB physical characteristics the system may "whitelist" a specific app or otherwise generate a stored indication of "known to be good" apps and/or "known to be malicious"

apps—e.g. to prevent a maliciously categorized app trying to access USB resources, from doing so.

The system typically stores, for each peripheral type e.g. each manufacturer and model number, the o/s interfaces which are "legitimate" for this peripheral input device to request from the o/s (and/or descriptors which are "legitimate" for this peripheral to send to the o/s. These sets of interfaces, descriptors etc. per peripheral type may be generated by human engineers, or the system may read in lists of such interfaces, or the system may accumulate a history of interfaces requested in the past by at least a minimal number of peripherals of type x, or a history of descriptors provided to the o/s by at least a minimal number of peripherals of type y.

The system may store, for each unique identifier of a population of identical peripherals, e.g. for each manufacturer and model number, an indication of the type of peripheral to which this population belongs. For example, the system might store an indication that the population of peripherals whose manufacturer is Samsung and whose model number is x, e.g. according to the descriptors, are (supposed to be) keyboards, whereas the population of peripherals whose manufacturer is HP and whose model number is y, e.g. according to the descriptors, are (supposed to be) printer/scanner/fax workstations.

The system may also store, for each interface, an indication of the type of peripheral which legitimately employs this interface. for example, the HID Keyboard Device interface is for keyboards, the HID-compliant mouse interface is for mouse devices, and the xxx interface is for remote keyboards.

Example

Consider the following 3 types of device—a standard keyboard, a boot-keyboard (includes composite USB device with two HID interfaces), and a mouse. Their respective properties are displayed below using a USB browsing tool.

The following data model, which identifies the composite keyboard as a composite device holding two sub-class HID devices (as indicated in the bNumInterfaces property).
Device Descriptor:
bcdUSB: 0x0110
bDeviceClass: 0x00
bDeviceSubClass: 0x00
bDeviceProtocol: 0x00
bMaxPacketSize0: 0x08 (8)
idVendor: 0x1A2C
idProduct: 0x0E24
bcdDevice: 0x0110
iManufacturer: 0x01
iProduct: 0x02
0x0409: "USB Keyboard"
iSerialNumber: 0x00
bNumConfigurations: 0x01
ConnectionStatus: DeviceConnected
Current Config Value: 0x01
Device Bus Speed: Low
Device Address: 0x0C
Open Pipes: 2
Endpoint Descriptor:
bEndpointAddress: 0x81 IN
Transfer Type: Interrupt
wMaxPacketSize: 0x0008 (8)
bInterval: 0x0A
Endpoint Descriptor:
bEndpointAddress: 0x82 IN
Transfer Type: Interrupt
wMaxPacketSize: 0x0008 (8)
bInterval: 0x0A
Configuration Descriptor:
wTotalLength: 0x003B
bNumInterfaces: 0x02
bConfigurationValue: 0x01
iConfiguration: 0x00
bmAttributes: 0xA0 (Bus Powered Remote Wakeup)
MaxPower: 0x31 (98 Ma)
Interface Descriptor:
bInterfaceNumber: 0x00
bAlternateSetting: 0x00
bNumEndpoints: 0x01
bInterfaceClass: 0x03 (HID)
bInterfaceSubClass: 0x01
bInterfaceProtocol: 0x01
iInterface: 0x00
HID Descriptor:
bcdHID: 0x0110
bCountryCode: 0x00
bNumDescriptors: 0x01
bDescriptorType: 0x22
wDescriptorLength: 0x0036
Endpoint Descriptor:
bEndpointAddress: 0x81 IN
Transfer Type: Interrupt
wMaxPacketSize: 0x0008 (8)
bInterval: 0x0A
Interface Descriptor:
bInterfaceNumber: 0x01
bAlternateSetting: 0x00
bNumEndpoints: 0x01
bInterfaceClass: 0x03 (HID)
bInterfaceSubClass: 0x00
bInterfaceProtocol: 0x00
iInterface: 0x00
HID Descriptor:
bcdHID: 0x0110
bCountryCode: 0x00
bNumDescriptors: 0x01
bDescriptorType: 0x22
wDescriptorLength: 0x0032
Endpoint Descriptor:
bEndpointAddress: 0x82 IN
Transfer Type: Interrupt
wMaxPacketSize: 0x0008 (8)
bInterval: 0x0A
A standard keyboard which is not a composite device may look something like:
Device Descriptor:
bcdUSB: 0x0200
bDeviceClass: 0x00
bDeviceSubClass: 0x00
bDeviceProtocol: 0x00
bMaxPacketSize0: 0x08 (8)
idVendor: 0x045E (Microsoft Corporation)
idProduct: 0x07B9
bcdDevice: 0x0114
iManufacturer: 0x01
0x0409: "LITEON Technology"
iProduct: 0x02
0x0409: "USB Keyboard"
iSerialNumber: 0x00
bNumConfigurations: 0x01
ConnectionStatus: DeviceConnected
Current Config Value: 0x01

Device Bus Speed: Low
Device Address: 0x0F
Open Pipes: 1
Endpoint Descriptor:
bEndpointAddress: 0x81 IN
Transfer Type: Interrupt
wMaxPacketSize: 0x0008 (8)
bInterval: 0x18
Configuration Descriptor:
wTotalLength: 0x0022
bNumInterfaces: 0x01
bConfigurationValue: 0x01
iConfiguration: 0x04
0x0409: "HID Keyboard"
bmAttributes: 0xA0 (Bus Powered Remote Wakeup)
MaxPower: 0x23 (70 Ma)
Interface Descriptor:
bInterfaceNumber: 0x00
bAlternateSetting: 0x00
bNumEndpoints: 0x01
bInterfaceClass: 0x03 (HID)
bInterfaceSubClass: 0x01
bInterfaceProtocol: 0x01
iInterface: 0x05
0x0409: "EP1 Interrupt"
HID Descriptor:
bcdHID: 0x0110
bCountryCode: 0x00
bNumDescriptors: 0x01
bDescriptorType: 0x22
wDescriptorLength: 0x0041
Endpoint Descriptor:
bEndpointAddress: 0x81 IN
Transfer Type: Interrupt
wMaxPacketSize: 0x0008 (8)
bInterval: 0x18
A standard mouse may have a data model similar to:—
Device Descriptor:
bcdUSB: 0x0110
bDeviceClass: 0x00
bDeviceSubClass: 0x00
bDeviceProtocol: 0x00
bMaxPacketSize0: 0x08 (8)
idVendor: 0x0000
idProduct: 0x3825
bcdDevice: 0x0100
iManufacturer: 0x00
iProduct: 0x01
iSerialNumber: 0x00
bNumConfigurations: 0x01
ConnectionStatus: DeviceConnected
Current Config Value: 0x01
Device Bus Speed: Low
Device Address: 0x10
Open Pipes: 1
Endpoint Descriptor:
bEndpointAddress: 0x81 IN
Transfer Type: Interrupt
wMaxPacketSize: 0x0006 (6)
bInterval: 0x0A
Configuration Descriptor:
wTotalLength: 0x0022
bNumInterfaces: 0x01
bConfigurationValue: 0x01
iConfiguration: 0x00
bmAttributes: 0xA0 (Bus Powered Remote Wakeup)
MaxPower: 0x32 (100 Ma)
Interface Descriptor:
bInterfaceNumber: 0x00
bAlternateSetting: 0x00
bNumEndpoints: 0x01
bInterfaceClass: 0x03 (HID)
bInterfaceSubClass: 0x01
bInterfaceProtocol: 0x02
iInterface: 0x00
HID Descriptor:
bcdHID: 0x0111
bCountryCode: 0x00
bNumDescriptors: 0x01
bDescriptorType: 0x22
wDescriptorLength: 0x0042
Endpoint Descriptor:
bEndpointAddress: 0x81 IN
Transfer Type: Interrupt
wMaxPacketSize: 0x0006 (6)
bInterval: 0x0A Analysis may include looking at the number of interfaces, Endpoint Descriptors, and class and sub-classes enumeration. For example, a mouse may have an additional interface of HID Input device identified as a keyboard (e.g. Class and subclass of 3,1,1 in addition to the mouse's 3,2,1 standard Class, Sub class and Interface protocol).

The embodiment illustrated herein by way of example, is particularly suited to operating systems (e.g. Windows 2000 onward) in which, as stipulated in Microsoft documentation, "drivers do not name device objects. Instead, they make use of device interface classes. A device interface class is a way of exporting device and driver functionality to other system components, including other drivers, as well as user-mode applications. A driver can register a device interface class, then enable an instance of the class for each device object to which user-mode I/O requests might be sent. Each device interface class is associated with a GUID. The system defines GUIDs for common device interface classes in device-specific header files. Vendors can create additional device interface classes.

For example, three different types of mouse devices could be members of the same device interface class, even if one connects through a USB port, a second through a serial port, and the third through an infrared port. Each driver registers its device as a member of the interface class GUID_DEVINTERFACE_MOUSE. This GUID is defined in the header file Ntddmou.h. Typically, drivers register for only one interface class. However, drivers for devices that have specialized functionality beyond that defined for their standard interface class might also register for an additional class. For example, a driver for a disk that can be mounted should register for both its disk interface class (GUID_DEVINTERFACE_DISK) and the mountable device class (MOUNTDEV_MOUNTED_DEVICE_GUID). When a driver registers an instance of a device interface class, the I/O manager associates the device and the device interface class GUID with a symbolic link name. The link name is stored in the registry and persists across system starts. An application that uses the interface can query for instances of the interface and receive a symbolic link name representing a device that supports the interface. The application can then use the symbolic link name as a target for I/O requests.

Alternatively or in addition, in terms of behavioral aspects, a utility such as powershell, netsh, or netcat may be run by the system in order to monitor behavioral aspects and detect anomalies. example behavioral anomalies, and how to detect them, include:

If there is a mass-storage USB device that is connected to the end-point a system may identify that large (relative to a stored or previously established threshold or norm) volumes of data are being imported or exported to this device (e.g. if an employee is about to leave his workplace and wants to take data with him). Another example, is that the system may identify that a user is plugging in and out various devices, which may trigger the system since such as user may be trying to understand what devices are allowed and which are not, thereby to gear up to a malicious activity.

Typically, if a device's behavioral aspects trigger the system, but the device's hardware and interface aspects do not, then the system merely issues a warning notification to the organization's security and/or IT department, since a purely behavioral anomaly may be indicative of a legitimate privileged user, rather than of a rogue USB device.

More generally, it is appreciated that the system may be pre-configured or user-configured or hardwired to take certain actions responsive to all or certain triggers. For example, responsive to some or all triggers pertaining to a given USB device (or more than one such) the system may issue a warning notification to the organization's security and/or IT department regarding that device. Alternatively or in addition, responsive to some or all triggers pertaining to a given USB device (or more than one such), the system may actually block the USB port is via which the given USB device/s are connected to the organization's network. For example, when the system is deployed, the system may support selection, by an administrator or other privileged user within the networked organization that the system is serving, of a hard or soft enforcement policy where "hard" refers to USB port blockage, whereas "soft" refers to mere issuance of notification alerts; typically the latter is more suitable for events which are less serious and/or less urgent security breaches and/or about which the level of confidence in deeming the event a security breach, is low relative to events, for which the former (hard policy) which is typically more suitable for events which are more serious and/or more urgent security breaches and/or about which the level of confidence in deeming the event a security breach, is relatively high.

To provide hard enforcement, typically, in the course of deployment, suitable software agents (aka SepioAgent or SepioService) (and/or dongles plugging into each port, e.g. the USB-Hardware protection dongle subject of co-pending patent document PCT/IL2017/050316 (WO 2017/158593) may be installed on each of the end stations or end units or endpoints (e.g. workstations) of the networked organization. These agents communicate with a central module within the system (AKA SepioPrime) on the one hand, and with the endpoint's operating system kernel on the other hand. The central module (AKA SepioPrime) typically provides all of any subset of configuration, policy assignment, monitoring, reporting and enforcement functionality.

Figure 5:
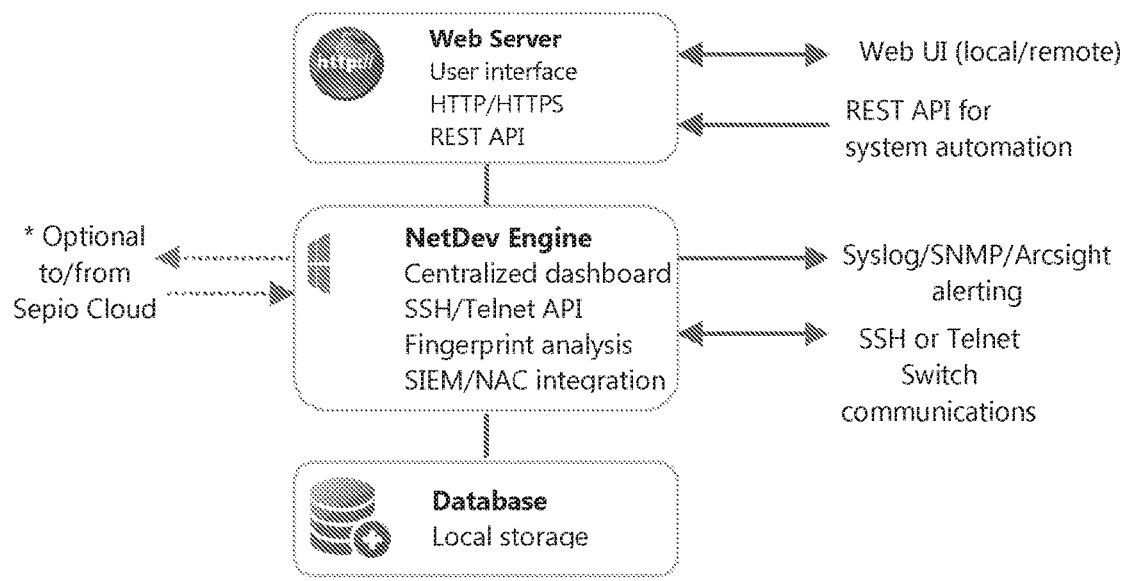

FIG. 5. Illustrates SepioPrime application modules according to certain embodiments, all or any subset of which may be provided. A WebServer module is configured for managing all user interface activities and other external interfaces (e.g. through REST API) that may be used for alert forwarding or process automation. For example when a malicious USB device is detected, an alert may be sent e.g. to the SIEM via REST API or to the EPS/EDR. An example structure of this API is detailed below, with reference to FIGS. 12a-18b.

A solutions database may be provided for holding the data scheme and/or models for the solution e.g. a finger print for each malicious USB device and/or other algorithm related logic parameters, and/or side all user and device management information. The NetDev Engine is an optional SepioCloud interface for retrieving updates from a central threat intelligence database that is continuously updated from multiple sources (e.g. open and dark web).

Typically, the networked organization's administrator determines inter alia whether each agent will operate in free mode (corresponding to a soft policy), or in armed mode (corresponding to a hard enforcement policy, for that endpoint). For example, the system may provide a administrator's GUI in which all endpoints are displayed, and, for each, the administrator may use a checkbox or other input option to determine whether armed mode or free mode is suitable. Typically, the default mode is free, in which case if a USB device connected to that endpoint triggers the system, a notification alert will be issued regarding that endpoint and its USB port, but the USB port will not be disabled. However, if a given endpoint's mode has been defined as armed, and one of the endpoint's USB ports triggers the system, typically, the agent sends a disable-port command to the operating system's kernel which has port-disabling capability e.g. for troubleshooting purposes. Typically however, the kernel also has a manual override option allowing a disable-port command to be manually overridden typically only by a privileged user. Therefore, if in armed mode, the agent typically ensures that the endpoint's port remains in disabled state e.g. by periodically sending disable commands, e.g. more than once per second, such that the periodicity of the USB port disable commands is higher than the duty cycle of the enabling command. The duty cycle may refer to the period of time that elapses from the manual enable-port request, until the moment in which the operating system actually re-activates the port. By sending disable commands at intervals smaller than the duty cycle, the system ensures that the port will never revert to its enabled state, because, typically, the service or system shown and described herein is validated or signed or authenticated or approved by Microsoft, thereby entitling the agent to reside in the operating system's kernel space. Consequently, by virtue of the agent's high priority for the kernel (by virtue of the fact that the agent is in fact part of the kernel), the disable commands issued by the agent take priority over processing manual enable commands (associated with the (low o/s priority) user space rather than with the (high o/s priority) kernel space), if any.

According to certain embodiments, the system keeps a log of time-stamped events pertaining to USB devices including each time a USB device was plugged into USB port x in computer endpoint y.

Example embodiments, which may be implemented wholly or in part (e.g. providing some or all operations or some or all blocks or some or all functionalities) are described in detail below with reference to FIGS. 1-11c.

The term "Sepio" in drawings and text herein, simply indicates hardware or firmware or software functionality which is part of the system shown and described herein, according to certain embodiments (as opposed, say, to "Microsoft azure" or similar services, which is an off-the-shelf component used in conjunction with embodiments herein. Of course, not all components included in the system shown and described herein are necessarily labelled "Sepio".

All USB devices have a hierarchy of descriptors which describe to the host information such as what the device is, who makes it, what version of USB it supports, how many ways it can be configured, the number of endpoints and their types etc. Common USB descriptors include:

Device Descriptors
Configuration Descriptors
Interface Descriptors
Endpoint Descriptors
String Descriptors A USB Security suite or USB module according to an embodiment of the present invention typically looks into the actual details of all or any subset of the descriptors e.g. according to their type.

For example, by looking into the specific descriptors (examining their values), one can gain information on the specific details of the driver used for a device (driver name, driver version) e.g. as described earlier in the context of a example mouse/keyboard identification process.

The system may can then take this data and compare it with other samples of the same driver and verify if this is a formally released driver or a modified/abnormal one.

According to certain embodiments, the system stores tables associating given descriptors and/or values thereof, with specific driver names/versions, and/or tables.

The suite or system may for example include processor/s configured to collect these descriptors, analyze them, compare them to data available to the system, apply thereto pre-defined rules and/or machine-learned classifications, compare interim outputs generated by the processor to default or end-user supplied policies, and issue a command to implement a security scheme e.g. perform a security-related action, accordingly.

Descriptors may include all or any of:

Device Descriptors e.g. all or any subset of those shown in the table of FIG. 6, and/or Configuration Descriptors—e.g. all or any subset of those shown in the table of FIG. 7, and/or Interface Descriptors—e.g. all or any subset of those shown in the table of FIG. 8, and/or Endpoint Descriptors—e.g. all or any subset of those shown in the table of FIG. 9, and/or String Descriptors—e.g. all or any subset of those shown in the table of FIG. 10.

According to certain embodiments, only a complete set of the above parameters uniquely identifies an instance USB device's actual (as opposed to ostensible) capabilities. Alternatively, or in addition, a complete set of the above parameters can identify ostensible capabilities of all non-tampered with instances of a given population of USB devices of a given type (given make and model number e.g.). By storing this data, comparison may be made between actual capabilities of an instance device, ostensibly of type (e.g. make and model number) x, and between ostensible capabilities of all USB devices of type x. Such comparisons may be useful in identifying tampered-with or modified instance USB devices.

According to certain embodiments, the subsystem for preventing attacks on at least one computer via its USB port (aka USB module) shown and described herein may include a software sub-module which may be software only (and e.g. may comprise the agent described herein and its cooperating modules e.g. the cloud module) which is operative for providing software protection, and/or the system may include a hardware submodule typically configured to enhance DLP (data leakage prevention). The software and hardware USB sub-modules may operate independently and outputs thereof many be combined by suitable logic which may implement a desired policy and may be deployed at a local or non-local (e.g. on the cloud) level. An example hardware sub-module including a system and method for protecting a computer system from USB related vulnerabilities is described in co-pending WO2017158593A1, entitled "A System, Method mid Computer Program Product for Protecting a Computer System From Attacks", the disclosure of which is hereby incorporated by reference. The hardware submodule may for example be implemented in accordance with any of the following embodiments described in the above-referenced co-pending patent document:

Embodiment 1

A system for protecting a Computer System interfacing with peripheral elements via a generic port associated with an open standard interface, the system comprising:

at least one Protection Device configured for installation between the Computer System and its Peripheral element is and including:

a pair of computer-peripheral interfaces (aka "near end" interface and "far-end" interface); and a uni-directional data flow limiter (e.g. uni-directional buffer) intermediate the computer-peripheral interfaces.

Embodiment 2

A system according to any of the preceding embodiments, and also comprising a first CPU configured to interface with the "near end" interface and to act as a virtual peripheral element.

Embodiment 3

A system according to any of the preceding embodiments, and also comprising a second CPU configured to interface with the "far-end" USB interfaces and to act as a virtual computer system.

Embodiment 4

A system according to any of the preceding embodiments and also comprising first and second CPUs configured to interface with the "near end" interface and "far-end" USB interfaces respectively and to act as a virtual peripheral element and a virtual computer system, respectively, and wherein the uni-directional data flow limiter is disposed intermediate the first and second CPUs.

Embodiment 5

A system according to any of the preceding embodiments wherein authentication firmware resides on the first CPU.

Embodiment 6

A system according to any of the preceding embodiments wherein security tunnel firmware resides on the first CPU.

Embodiment 7

A system according to any of the preceding embodiments and also comprising a dedicated power supply that feeds at least one peripheral element and is monitored to provide an indication for at least one manipulated device/attack.

Embodiment 8

A system according to any of the preceding embodiments and also comprising behavioral analysis functionality configured to receive data flowing between computer and peripheral and to provide an indication for at least one manipulated device/attack.

Embodiment 9

A system according to any of the preceding embodiments wherein the hardware based uni-directional data flow limiter is permanently configured to invoke only one of two states each ensuring that data flows only in one direction, i.e. either only out, or only in.

Embodiment 10

A system according to any of the preceding embodiments wherein the hardware based uni-directional data flow limiter invokes an input-only state, and is used in conjunction with a USB port, thereby to protect the computer system against data leakage, while an input oriented peripheral is communicating with the USB port.

Embodiment 11

A system according to any of the preceding embodiments wherein the hardware based uni-directional data flow limiter invokes an Output Only state, and is used in conjunction with a USB port exporting data from the computer, thereby to ensure that the computer is detached from any external device or entity that could "push" harmful data or files inwards.

Embodiment 12

A data security system comprising:
functionality operative to detect a profile for each device trying to use a password e.g. hostile or attacking device that can "playback" predefined known keystroke patterns,
and to compare the profile to a known e.g. discovered and stored profile for the user who owns the password.

Embodiment 13

A system according to any of the preceding embodiments and wherein the profile comprises a unique user "fingerprint" characterized by the time difference between each character and the next character when the user types her or his password or any other word or sequence of characters.

Embodiment 14

A system according to any of the preceding embodiments wherein the Protection Device is operative to undergo training e.g. using supervised machine learning technology, in which users' profiles are learned, and, accordingly, to detect a profile for each device trying to use a password, e.g. hostile or attacking device, that can "playback" predefined known keystroke patterns, and to compare the profile to a known profile for the user who owns the password.

Embodiment 15

A system according to any of the preceding embodiments and wherein the profile comprises a unique user "fingerprint" characterized by the time difference between each character and the next character when the user types her or his password (or almost any other word or sequence of characters).

Embodiment 16

A system according to any of the preceding embodiments wherein, if
Authentication Software on the Computer System detects that the Protection Device is not present, the Authentication Software uses management Software on the Computer System to alert at least one of the user and the system administrator.

Embodiment 17

A system according to any of the preceding embodiments wherein, if
Authentication Software on the Computer System detects that the Protection Device has been replaced, the Authentication Software uses management Software on the Computer System to alert at least one of the user and the system administrator.

Embodiment 18

A system according to any of the preceding embodiments wherein, if Authentication Software on the Computer System detects that the Protection Device is not present, the Authentication Software uses management Software on the Computer System to automatically disable the port to ensure no infection can come through.

Embodiment 19

A system according to any of the preceding embodiments wherein, if
Authentication Software on the Computer System detects that the Protection Device has been replaced, the Authentication Software uses management Software on the Computer System to automatically disable the port to ensure no infection can come through.

Embodiment 20

A system according to any of the preceding embodiments wherein plural host interfaces are used for connecting plural Peripheral Products to the Computer System via the port e.g. via a single port.

Embodiment 21

A system according to any of the preceding embodiments wherein the
Protection Device comprises a distributed device with separate near end and far end portions connected by a single optical fiber while maintaining communications uni-directional on the hardware/physical layer.

Embodiment 22

A system according to any of the preceding embodiments wherein the Protection Device is operative to encrypt all data coming from the peripheral device via the
Protection Device, so that the data enters the Computer System (aka "local computer system") and is transmitted over the network without being readable and is decrypted only within a remote computer system that is safe and secured.

Embodiment 23

A system according to any of the preceding embodiments which is deployed in a retail environment such that even if a cash register computer (the local computers) is compromised e.g. becomes infected, or the network is hacked or tampered with, credit card data cannot be stolen because the credit card data is present within the compromised computer system or network, only in encrypted form.

Embodiment 24

A system according to any of the preceding embodiments and wherein the hardware based uni-directional data flow limiter is implemented in hardware e.g. comprises a uni-directional data buffer.

Embodiment 25

A system according to any of the preceding embodiments wherein the
Protection Device is configured for installation between the computer system and its peripheral element/s via a generic port associated with a computer-peripheral interface e.g. open e.g. standard e.g. USB.

Embodiment 26

A data security method comprising:
providing a pair of computer-peripheral interfaces with data communication therebetween: and
providing a power supply operative to supply power to a peripheral connected to one of the interfaces; and
monitoring current usage by sampling current drawn from the power supply and to detect abnormal patterns in the peripheral's current usage and, responsively, to disable data communication between the pair of interfaces.

Embodiment 27

A method for protecting a computer system interfacing with peripheral elements via a generic port associated with an open standard interface, the method comprising:
providing at least one Protection Device configured for installation between the computer system and its peripheral element/s and including:
providing a pair of computer-peripheral interfaces (aka "near end" interface and "far-end" interface); and
providing a uni-directional data flow limiter (e.g. uni-directional buffer) intermediate the computer-peripheral interfaces.

Embodiment 28

A system according to any of the preceding embodiments which is deployed between a pair of computer-peripheral interfaces.

Embodiment 29

A data security system comprising: a pair of computer-peripheral interfaces with data communication therebetween; and a power supply operative to supply power to a peripheral connected to one of the interfaces; and apparatus operative to monitor current usage by sampling current drawn from the power supply and to detect abnormal patterns in the peripheral's current usage and, responsively, to disable data communication between the pair of interfaces.

Embodiment 30

A data security method comprising:
detecting a profile for each device trying to use a password e.g. hostile or attacking device that can "playback" predefined known keystroke patterns, and
comparing the profile to a known e.g. discovered and stored profile for the user who owns the password.

An embodiment of the invention includes e.g. in combination with any other embodiment described herein, a dongle (e.g. the USB-Hardware protection dongle subject of co-pending patent document PCT/IL2017/050316 (WO 2017/158593)) that plugs into a port of a computer (say) and is operative for monitoring and securing the usage of that port, including security of data flowing in and out of the computer from/to a USB (say) device that is attached through the dongle and the port.

Device Mapping is one functionality that may be provided, e.g. in conjunction with the USB module, according to certain embodiments.

One typical step in securing an organization is visibility. For example, existing scanning tools such as Windows Device Manger or USB Device Viewer can provide information on the physical "inventory" of devices—End-point X has 1 Lenovo Keyboard, Logitech Mouse etc. This is a limited view compared to what is possibly the actual functionality of the device, for example an USB-Audio Microphone device which can also support an HID interface which allows the device to inject key strokes to the end-point. In most cases there may be a perfect matching between what the device is perceived to do (aka ostensibly does) and what it actually does, however, typically, the system's aim is to detect cases where the above do not match. In the above example, an end-user may have believed that an audio device was being purchased. However, the device was actually an "extended functionality" device, which poses a potential threat. The USB Security suite typically deepens understanding by determining what USB device is really connected to the end-point's USB port, as opposed to what is ostensibly connected. A true understanding of the actual functionality that is supported by the connected device provides information which may be used as an input, in logic configured for determining the security scheme.

The USB Security suite typically provides the security officer or system administrator or other pre-designated typically privileged user, with a visual indication, where a device's "nested" functionality is presented e.g. graphically displayed, in any clear and informative way.

Device Safety Level Marking is one functionality that may be provided, e.g. in conjunction with the USB module, according to certain embodiments.

A USB security suite aka USB module, according to certain embodiments is configured to determine the level of risk posed by a specific device. For example, a device with a very clear functionality which is in line with its descriptors, i.e. a known source driver, may be deemed to be a more secured device. The final marking is greatly influenced by the quality of information sources for it—evidence of a "smoking gun" such as descriptors which are used for attack tools such as the RubberDucky, BushBunny or Raspberry Pi Zero HID attacks, may generate the highest risk mark. Known vendors, with descriptors which are fully in-line with the expected functionality, may receive the lowest risk mark.

The USB security suite typically collects all or any subset the above mentioned data about the device e.g. descriptors, feeds it to its validation algorithm which verifies the advertised functionality, compares it to similar devices in its device database, and validates its driver (date, version, vendor etc.).

A centralized device based threat database is typically provided—the data feeds to this database may for example be from all or any subset of the following sources:

Mass volume comparison and analysis of devices with similar functionality

Known security issues with specific devices (either from the WWW or dark net forums and markets)

Actual reporting from organizations that suffered from cyber-attacks and could provide forensic data that can enrich the threat database The database is structured by fusing multiple information sources e.g. as per all or any subset of the following: first, when an actual device is introduced, all of its descriptors (as described above) are recorded. Second, publicly available sources such as WWW (which include legitimate vendor support web sites, penetration testing sites etc.) which include a higher level of information than the descriptors (in most cases, driver version, time stamp, CRC etc.). A third source is publicized (or disclosed under NDA to the company) forensics on previous attacks, where specific USB tools were used.

The final outcome of this analysis phase may include or consist of a single number representing the safety level of the device—a higher score means that the device is most likely to perform as intended and pose a low security risk, while a low grade mark indicates a questionable level of authenticity. The organization security officer, as part of his hardware policy enforcement, can determine the minimal acceptable safety level. A device below minimal level may be blocked until approved by the security officer in accordance with its policy enforcement preferences (immediate block, alert only, or put on special watch list to closely monitor that device's behavior). User Profiling is one functionality that may be provided, e.g. in conjunction with the USB module, according to certain embodiments.

Each end-point user has its own behavioral characteristics which may comprise the way typing is done, which devices are plugged in, typical USB traffic volume for each type of connected device. For example, a significant rise in USB traffic can be due to legitimate mass data copying (even if the mass storage device itself is authenticated and approved), or the work of an internal abuser (such as an employee who is about to leave his current workplace and wishes to build his own archive). The organization's security officer can determine what the alerting thresholds are. and which policy should be enforced with regard thereto, and whether he wishes to prevent the process, or merely be notified upon its occurrence.

Another example is differentiating between keyboard scripting tools and human beings. The system may, without necessarily authenticating specific users, determine when it is believed that a human being is doing the actual typing and when it is an automated scripting tool. This can be done by several timing measurements. For example, how common is it to find someone who types in, without any pace changes for (say) 15 sec, a significant amount of keystrokes? In cases where suspicion arises (e.g. keystrokes are equally spaced in time, for a time-duration of at least S seconds, or any other measurable characteristic of an incoming stream of keystrokes, which can differentiate human-typed keystrokes and output of an automated scripting tool), the system may, for example, pop up a CAPTCH (user typing challenge) that will verify that a human being is operating.

The solution also may identify cases which may be extremely exceptional. For example, when toggling the Caps Lock LED indication for data exfiltration from the endpoint, usually there will be a certain human behavior in the way this LED is lit (indicating Caps Lock key has been pressed for upper case typing). Nevertheless, if the solution detects that the Caps Lock is pressed too often over a period of time, an alarm typically will be triggered, as this could be a sign of covert data exfiltration.

The analysis typically will be done on all keys and key combination strokes (including special function keys) that can cause physical external effects (visual, audible or electrical). The thresholds for such alarm triggering may be determined by typical typing behavior—number of consecutive Caps/Num lock strokes, rate of strokes etc. For example, it may be deemed illogical that a user hits the Caps Lock key 500 times without pressing on any other key. ( Another example could be a case where a malicious user tries to type in a binary file (in base64 format) to bypass security measures. This may be identified by the system if there is a very long, e.g. over-threshold sequence of keys typed in without any space or enter key, in which case a notification alert aka trigger may be configured.

User profiling may be defined as identifying behavioral aspects of a malevolent peripheral for instance by identifying abnormal USB device behavior, and, typically providing an ex-filtration counter measure (for example, when someone tries to leak out information by toggling the Caps Lock LED on and off). In such cases, the Sepio security suite shown and described herein may alert the CISO through its alerting mechanism (SIEM interface, Syslog etc.) that abnormal activity is taking place. The toggling key strokes can be locally logged in for further investigation (by attempting to determine what the transmission pattern is, and, upon it being determined, determine the nature of the leaked data). The CISO may apply a more strict approach where a logical "fuse" is blown when a certain threshold is crossed (e.g. number of caps lock/num lock transition per sec.)

Content Aware Protection is one functionality that may be provided, according to certain embodiments.

In many cases, an attacker impersonating as an HID device, mainly as a keyboard, will go through a sequence of commands which include specific references to pre-installed applications or OS utilities such as Powershell, Netsh etc. An example of such an HID attack carried out by a Rubber Ducky is illustrated below (specific alerting words are bolded)—

DELAY 3500
GUI x
DELAY 350
STRING a
DELAY 1000
LEFT
DELAY 1000
ENTER
DELAY 350
STRING start powershell
ENTER
DELAY 300
STRING cd C:\Users\Sepio\Documents
ENTER
STRING New-Item test.bat
ENTER
STRING add-content test.bat "@echo off
ENTER
STRING echo Hello this is a test file

```
ENTER
STRING pause
ENTER
STRING dir c:\windows
ENTER
STRING pause"
ENTER
STRING start iexpress
ENTER
DELAY 500
ENTER
ENTER
STRING test
ENTER
ENTER
ENTER
TAB
ENTER
DELAY 500
STRING C:\Users\Sepio\Documents\test.bat
ENTER
TAB
TAB
ENTER
STRING cmd/c test.bat
ENTER
ENTER
ENTER
STRING C:\Users\Sepio\Desktop\test.EXE
ENTER
ENTER
DOWN
ENTER
DELAY 500
ENTER
DELAY 1000
TAB
TAB
ENTER
DELAY 500
ALT F4
LEFT
ENTER
DELAY 200
STRING netsh wlan set hostednetwork mode=allow ssid=noobcake key=12345678
ENTER
DELAY 100
STRING netsh firewall set opmode disable
ENTER
```

Such commands typed by what seems to be a keyboard, typically will cause no alerts by existing End-Point-Security solutions.

Upon identifying such potentially risky commands in the keyboard input feed, a challenge typically will pop up, and the user typically will be prompted to verify that it is a human being and not a scripting tool. Until the identity of the source has not been verified, the command typically will not be processed. Statistics typically will be recorded of all "triggering words" e.g. "all or any subset of powershell, iexress, netsh. Typically, in any case of confirmation failure, the system is triggered e.g. an immediate alert event typically will be triggered and sent to a local or remote centralized management server.

Typically, the system data repository includes a list or dictionary of such triggering words and, typically, the dictionary is updated as new commands and "alerting" key word combinations typically will be added. One of the sources for such new dictionary entries typically will be publicly available scripts (through the WWW or dark web forums and markets).

One source for such scripts may be found in the following https link-github.com/hak5darren/USB-Rubber-Ducky/wiki/Payloads from which it may be appreciated that there are several payloads (scripts) that perform various tasks, some potentially harmful. By conducting typically off-line, typically human engineer analysis of the scripts and identifying the "active" section in them, the dictionary may be updated accordingly, to include words (or strings or commands) associated with potentially harmful payloads or scripts. Subsequently, when the system encounters such a command or sequence of commands or words or strings, the system may trigger e.g. alert the user or the centralized management of this occurrence.

Forensic information is one functionality that may be provided, according to certain embodiments.

When an organization has been unfortunate enough to suffer from a device based cyber-attack, a useful piece of forensic information is where has the device first connected to, and to follow its "physical propagation" along the organizations end-points. This information can then be also cross-correlated with physical security systems (CCTV etc.)

The USB protection suite can backtrack where and when that device was plugged in, and to which end-point, and when (and if) its capabilities have been modified, providing valuable forensic information that typically will allow security analysts to pinpoint the exact entry point. This may be achieved by analyzing the event log which includes all USB attach/detach events, so one can follow the trail of occurrences and have insight of the entire process—for example—USB device X S/N Y was first introduced to the organization on end-point Z on a certain date and time. It was then removed and reconnected to end-point V etc. It may be concluded that this device is effective in minimum end-points Z,V etc.

A security suite according to certain embodiments, serving as a detection tool for manipulated hardware peripherals, is now described in detail. All or any subset of described or illustrated components, elements and functionalities, may be provided. The security suite can be deployed 100% on-premises without any external components, or over a public or private cloud infrastructure.

According to certain embodiments, a Sepio Agent component provides visibility of USB devices at the interface level, e.g. a whitelist functionality of (theoretical or ostensible) vendor and product can be deployed, and/or continuous monitoring of actual functionality and behavior of the devices may be provided. A centralized management subsystem (e.g. Sepio Prime illustrated herein) may be generated and be presented to users, status and security dashboards, and may be operative for defining and distributing device usage policy across each organization. a (typically small footprint) software agent (e.g. Sepio Agent herein) may run on servers and workstations in an air-gapped part of a network to be protected by the suite. The agent typically is configured to continuously detect and identify all attached USB peripherals and to monitor their behavior and/or internal communications. The agent may be completely autonomous and self-contained, and is typically able to block entire peripherals or only functional parts (internal interfaces) instantly e.g. if they breach a preset policy.

Sepio Prime may be used in a Docker container environment and may provide a web user interface for provisioning and policy configuration. The system administrator can lock a list of approved devices (a white list) based on existing and recognized devices, or on a known list of devices found to be harmless in other installations.

Syslog and SNMP traps may be used for logging of status and detection events, and Splunk may be used for subsequent analysis.

An example architecture for an implementation of an embodiment of the suite, according to certain embodiments, is now described; all or any subset of the architectural components may be provided.

The architecture and software components of the Security Suite are described herein, which is an example implementation of certain embodiments. The term "Sepio" as used herein is intended to refer to an embodiment of the present invention.

Some of the components may be installed locally on the workstations and servers (the USB Device Security software agents), while others can be deployed locally as well (on-premise), on a public cloud, or on a private cloud.

Some of the components may be deemed mandatory for a given use-case, while others may be deemed optional and provide additional services, which the administrator can decide whether are needed or not.

The Security Suite may be modular and may include all or any subset of three threat oriented modules. Customers can decide to deploy and start with only some of the modules, while others can use all three of the following threat oriented modules:

USB Device Security: a functional module, which may be operative in accordance with any of the teachings shown and described herein, and which is used for detecting and monitoring the behavior of all the USB device assets in the organization. provides full visibility of all connected devices, analyzes their capabilities and behavior in real time, and supports policy enforcement typically allowing or blocking specific devices and interfaces e.g. according to a defined policy.

Transparent Network Devices Detection functional module: typically configured for continuously monitoring the network searching for rogue network (LAN) devices that are transparent to existing security tools. Transparent devices have no network entity of their own (no IP address, no MAC address etc.) and they may be used for getting an invisible foothold in the target network, and for leaking sensitive information in an out-of-band manner while the existing tools are blind.

Firmware Validation functional module: this is responsible for detecting infected or manipulated firmware and software that is running on authentic and authorized devices in organizations. Such devices can be abused for spreading malware within the network, and for collecting and storing sensitive data that will later on be ex-filtrated from the organization.

A suitable architecture operative for providing USB Device Security is now described in detail.

Reference is now made to FIG. 1.

The USB Device Security module may be based on a small footprint software agent (SepioAgent) that is running on the workstations and servers in the organization. Typically the agent is characterized by all or any subset of the following: The agent continuously detects and identifies all attached USB peripherals.

The capabilities and real-time behavior are analyzed, and the device is given a security grade/rank that is based on its actual and current behavior of this instance, together with recorded behavior of similar devices as being analyzed in the Cloud Service.

The system administrator can lock a list of approved devices (a white list) based on the existing and recognized devices, or on a known list of devices that were witnessed as being unharmful in other installations.

A visibility report provides the administrator with a list of all the device assets in the organization including vendor and functional information, and to where each device is connected.

Known to be risky or badly-behaving peripheral devices may be distinctively marked.

The system then recommends on best practice security policy, and, once the chosen policy is deployed, each usage breach or attack attempt will be immediately reported and blocked.

Figure 2:
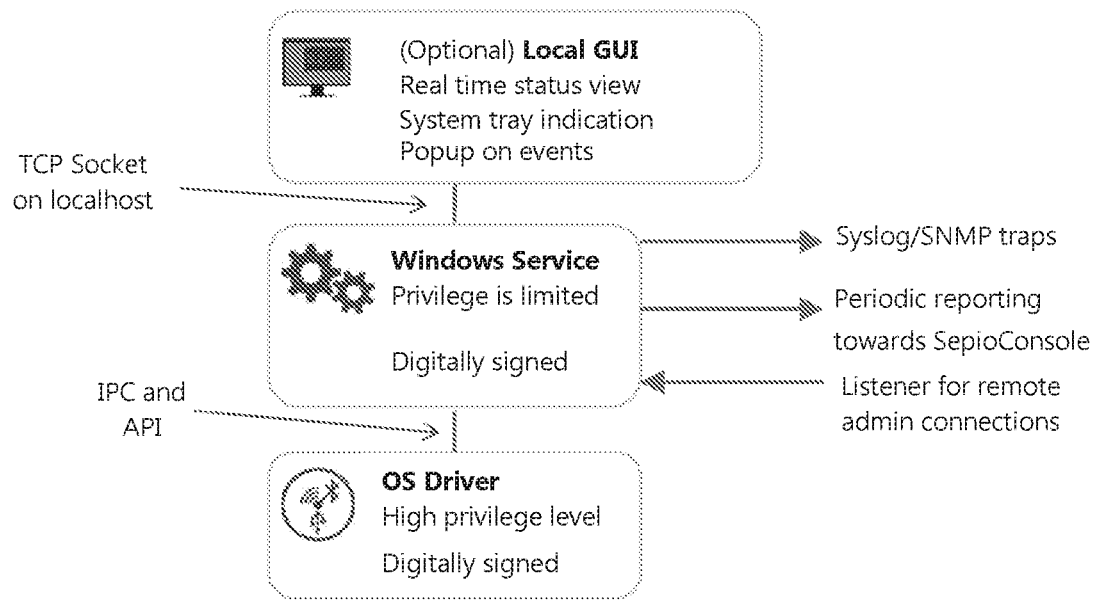

SepioAgent Components according to certain embodiments, all or any subset of which may be provided, are now described in detail. Reference is now made to FIG. 2 illustrating elements or components, all or any subset of which may reside on an endpoint e.g. laptop.

OS Driver: The signed driver can run at the highest possible privilege level and is therefore typically used for all low-level interactions with the operating system. The driver level is typically used whenever it is required to block or interfere with the operation of a device that is not approved as part of the policy, or an approved device that starts acting dangerously. The driver is typically controlled by the service layer that runs the actual business logic.

Service: typically configured for business logic of all or any subset of: tracking the peripheral devices, identifying their vendor/product (asset) and profile (e.g. all or any subset of interface/class/subclass/protocol) info, tracking the device descriptors and drivers and their plug-and-play behavior, keeping track of their behavior with/against the operating system, and ensuring an approved/defined security policy is enforced.

The service is typically GUI less and runs automatically when the system starts, and may have all or any subset of the following three interfaces with user or management related entities:

Socket interface with a local UI application (administrators may prefer not to install).
  Periodic reporting towards centralized management subsystem e.g. console subsystem described herein.
  Listener for remote administrator connections—which may come from the centralized management subsystem e.g. Console, but can also act as an API for external systems.

Local GUI application e.g. sepioUI, e.g. for monitoring (if the logged in user is only a "user") and/or configuration (when run as an "administrator") of the Service. Typically, when running, only a system tray icon is displayed, and represents the overall security status. When an event takes place, a popup may appear on the screen indicating that a USB device is now attached. At any time that the user clicks on the system tray icon, a UI window may be displayed including information regarding the workstation and peripherals e.g. a list of devices, e.g. one per USB port of the workstation, and for each existing device, the manufacturer thereof, the VID, PID, serial number, and checkboxes therefor e.g. indicating the system mode for the USB port in question.

Related SepioPrime components, all of any subset of which may be provided according to certain embodiments, are now described.

Figure 3:
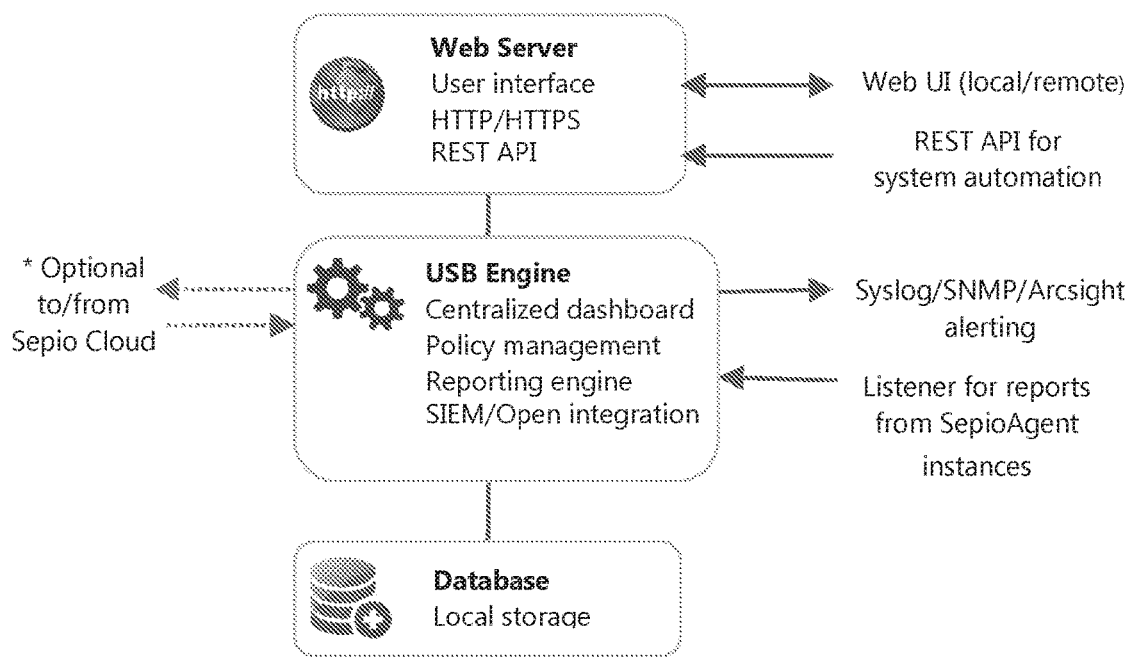

Reference is now made to FIG. 3 illustrating elements or components all or any subset of which may reside on a CPU.

SepioPrime may be built as a standalone and self-contained centralized management subsystem or system.

SepioPrime may be deployed using container technology (Docker) and is therefore easily installed on physical or virtual machines on top of the popular operating systems.

SepioPrime may comprise a web application, all external and internal communications may be HTTP/HTTPs based, and user and administrator access may be supported using a web UI.

Several user privilege levels may be provided, to allow granularity of monitoring only (read-only) or control (read-write) access to the system.

An integrated database may be provided to store real-time information and/or configuration and/or administration setup.

A graphical dashboard may be provided to present the security and threat environment, e.g. to take quick action, as needed.

A USB engine may be provided, which may provide all or any subset of the following functions:
  Dashboard—Graphical and easy to follow status indications and KPIs including remote workstations, the status of their peripheral devices, list of unapproved peripherals (actually connected or attempts), badly behaving and dangerous profiles, known to be bad devices, blocked devices etc.
  Policy Management—The interface for defining and enforcing the security policy—what is allowed, what is not allowed, what happens when a bad (not approved, or device that includes malware) device is detected etc.
  Report Engine—Full asset report, including the type and characteristics of the peripherals, including their specific type and serial number, based on the workstation they are physically attached to.
  Cross indications about the enforcement status—whether the system is operating within the approved and predefined policy, or whether there is infringing.

A suitable database may be provided. An integrated PostgreSQL database image may be used to store and retrieve the network device parameters. The database is typically not exposed, and instead is typically accessible only internally, by the USB Engine.

A cloud service may be provided to add an additional, typically optional layer, of device behavior analysis, combined with threat intelligence regarding devices known to be vulnerable, e.g. if the user configures her or his SepioPrime to connect with SepioCloud. The SepioCloud may include a data repository which collects data collected or generated by all deployed instances of the system shown and described herein hence provides wide and global visibility of a very large population of peripheral devices with many instances of each type. The cloud service may be operative for physical and/or behavioral fingerprinting of many USB peripherals e.g. as described herein, so as to provide the local system with broader insights and early warning regarding attacks and vulnerabilities, even before they have any effect on the individual organization that the local system is protecting. The cloud service may be deployed based on (say) Microsoft Azure or similar infrastructure and can be deployed globally Or in any Microsoft supported regions (Microsoft maintains (currently 38) regional data centers to shorten overload and data transport time and cost, whereby users are usually allocated a server in their physical proximity. For example consider a given attack that has occurred in a certain facility. Identifying the malicious USB device that was used to exfiltrate data, will allow the system to proactively push this information to other systems which use the same or similar USB device infrastructure, to indicate that an attack has been found to have been carried out by "piggy-backing" a legitimate device.

Figure 4:
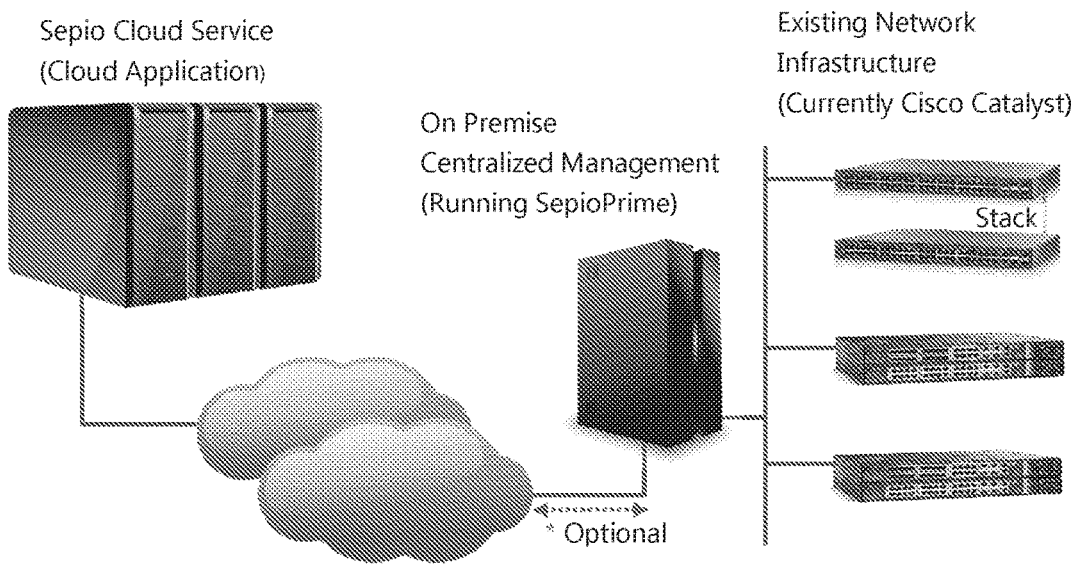

Architecture for Transparent Network Devices Detection according to certain embodiments, is now described in detail. Reference is now made to FIG. 4.

The Network Security module typically runs as part of the SepioPrime management server and may communicate with an existing Cisco network infrastructure to collect and analyze low level device information regarding the elements that are connected to the switch ports. The software typically computes real-time fingerprints of devices connected to the switch ports and compares them against a known set of malicious devices together with specific network topology related information.

As a result, this can detect and report on the existence of transparent and ghost devices, otherwise completely invisible by existing security tools. The system administrator can define the scanning and monitoring profile and parameters, and can configure the interfaces for reporting on discovery of malicious devices. A visibility report provides the administrator with a list of suspected devices, and typically indicates to where (e.g. which port of which endpoint) each device is physically connected.

Related SepioPrime Components, all or any subset of which may be provided according to certain embodiments, are now described with reference to FIG. 4.

NetDev Engine: if SepioPrime or a modular on-premise server system is provided, a NetDev Engine may be provided, which is a part of the system that shares and utilizes the common infrastructure functions and capabilities. NetDev Engine is typically configured for communicating with the communications infrastructure of the organization, and is typically configured to poll, monitor, and analyze low-level information to detect the existence of malicious transparent elements in the network. The system administrator can define or import a list of Cisco switches, and set the specific functions related to their polling—when and how often to scan, whether it is allowed (or not), and when to toggle the link status of ports, what to do when a malicious devices is detected etc.

The system then autonomously runs, based on the defined scanning policy, and will detect and report on the existence of transparent or rogue LAN devices. The Transparent Network Devices Detection module can store switch access credential information internally, or interface to an existing TACACS+ system for obtaining single-use or temporary access rights.

An integrated PostgreSQL database image may be used to store and retrieve the network device parameters. The database is typically not exposed and is therefore accessible only internally by the NetDev Engine.

A cloud service e.g. as described above, may be provided, to improve the probability of detecting transparent network devices in an individual organization.

An example installation process for installing an implementation of an embodiment of the present invention, is now described in detail. The embodiment may include all or any subset of:
  security agent for providing deep visibility and allowing policy enforcement for USB devices that are connected to the PC.
  SepioService: independent self-contained software, that can be optionally monitored using the related SepioUI component. SepioService can also be remotely managed by centralized management application e.g. console.

Below, square brackets [ ] surround optional items, angle brackets < > surround user-supplied values. The percent sign % represents the regular command shell prompt.

SepioService and SepioUI can be installed:
Locally on each user's computer, as a standalone workstation; or
Using a suitable network deployment tool e.g. compatible with MSI installation packages.

Larger-scale networks that use centralized management and administration tools may, when using network installation, perform pre-configuring of some setup parameters.

Microsoft Windows Operating System (or similar) may be used to install.
SepioService typically does not use a local database.
SepioService typically uses several TCP ports for communication between the service and
SepioUI and the centralized management module e.g. console.
In order to support proper operation, suitable firewall rules are typically defined e.g. allow the following in the firewall:

SepioService to SepioUI: The socket e.g. as described in table form in FIG. 11a typically carries periodic status updated from SepioService to SepioUI. Alternatively or in addition, this socket may be used be by SepioUI for sending configuration updates to SepioService.

SepioService to centralized management module e.g. SepioConsole: the socket .g. as described in table form in FIG. 11b carries periodic status reports from SepioService to centralized management module e.g. SepioConsole.

centralized management module e.g. SepioConsole to SepioService: The socket .g. as described in table form in FIG. 11c carries configuration updated from SepioUI to SepioService. If Centralized Management and/or Syslog support are desired, the IP address of the management server and/or of the Syslog server are used during installation respectively.

The following components may be installed:
SepioService—The underlying worker service and software driver package.
SepioUI—An optional local user interface application with Windows system tray supports.
An installation wizard typically installs e.g. in the Cyber Sepio Systems directory in the user's Program Files.
Network Installation may follow the procedure of the network installer tool being used.
SepioService typically supports the following installation parameters:
Syslog Server Address—A remote server IP address.
If configured, SepioService will automatically send info and alert messages on system events.
Centralized Management Address—The IP address of the centralized management tool or system or subsystem.
An example of using both parameters (one line):
SepioService_1.70.07.msi SYSLOGSERVERADDRESS=212.176.9.35
CENTRALIZEDIP=192.168.100.20
SepioUI as well as sepioService, may typically be installed either locally or using a network installation tool.

If a new and not approved USB device is plugged in, then at least when the system is in Free mode that device may be highlighted e.g. will appear in yellow. Text may indicate that the device is not approved, but still enabled (due to the Free mode settings).

The administrator can change the mode to 'Armed' in which case the non-approved devices or specific interfaces in approved devices, will be blocked or disabled.

The user can approve the specific interface, or all of them, however, typically, as a precaution, a USB device that was previously blocked needs to be manually enabled.

For example, the user may see a USB device marked as approved, but not enabled. Clicking on the line of the disabled device or otherwise selecting, will allow the user to enable that specific device, or all check marked devices. After enabling, the window will now show that the USB mouse (say) is approved and enabled. Disconnecting the USB mouse will leave a suitable e.g. grayed-out indication, meant for devices that are approved but not connected and which are now present.

The user can specify the external interfaces where notifications and events messages are sent upon any change in port status.

The main window may have plural tabs e.g. all or any subset of: peripherals tab, s tab, configuration tab. The administrator can use a configuration tab to view or set specific system behavior.

For example, all or any subset of the following parameters can be modified:
centralized management module (e.g. console) IP address—main management server managing all deployed agents. The user may indicate a TCP port therefor.
Syslog server—sends notifications and alerts to a standard syslog server. The user may indicate (e.g. using a binary slider or other binary input device) whether or not the server is logging.
Local logging—specify the folder in which local logs are stored. The user may indicate whether local logging is on or off.
Metadata export—optional export of USB descriptors' meta data to a threat intelligence cloud service for deeper analysis of cyber security threats. The user may indicate http yes/no and/or may indicate enabled/disabled.

The Sepio icons, which appear in the icon section in the system tray, follow suitable status indications, which may for example be color-coded. For example:
No security exceptions—icon will be colored gray.
When a non-approved device is connected, the icon will turn red.
When a device, previously disabled, is now approved and waiting to be enabled, the device with its status colored in yellow may appear.
When a USB device is connected to the PC, a momentary pop-up will appear in the task bar indicating to the user the current security status of the USM device e.g. "attached".
When the device is approved and enabled, "removed" when the device is removed, the pop-up will appear again with the detach message, and suitable designation of a disabled attached device e.g. the device may be colored red, whereas a device that was previously disabled, and is now approved, will be colored yellow until enabled.

the functionality supported by the Dongle tab is useful in conjunction with the USB Uni-directional HID dongle subject of co-pending patent document PCT/IL2017/050316 (WO 2017/158593).

is appreciated that any of the agent (typically a service that is installed and runs on each host machine and provides USB protection as described herein), prime (centralized management inter alia, may communicate with manage and monitor agents on hosts, and may also communicate with cloud subsystem and update local subsystems as appropriate), cloud (centralized threat intelligence data repository which may store fingerprints and attack mitigation data, service, UI, console elements or components or subsystems shown and described herein may be omitted. for example, sepioUI and Console as described herein may, as relatively limited local tools, be omitted.

As described above, when a malicious USB device is detected, an alert may be sent e.g. to the SIEM via REST API or to the EPS\iEDR. An example structure of this API is now described, with reference to FIGS. 12a-18b.

In addition to using the simple Syslog formats, additional CEF (Common Interface Format) support may be provided in order to improve the interoperability of security products by aligning the logging messages.

Possible Syslog Message Formats are now described.

Two variants of Syslog are available—the RFC 3164 which is the older one (also known as BSD Syslog or Legacy Syslog) and the RFC 5424 which is the newer one and also known as IETF Syslog).

Both variants have a similar nature, but the IETF variant is much more flexible extendible.

Message Examples

Legacy-Syslog:
<133>Feb. 25 14:09:07 Webserver syslogd: restart.
IETF-Syslog:
<34>1 2016-10-11T22:14:15.003Z mymachine. example.com su-ID47-BOM'su root' failed for janer on/dev/ ptsi8.

Typically each message is assigned a priority field, e.g. A function (8×Facility+Severity) of the data e.g. As shown in the tables of FIGS. 12a-12b.

In addition, every message typically has a timestamp that is added by the sending party.

The time formats typically differ between BSD Syslog and IETF Syslog e.g.:

Legacy-Syslog:
MMM DD HH:MM:SS i.e. FEB 25 14:09:07
IETF-Syslog:
ISO Timestamp i.e. 2016-10-11T22:14:15.003Z Any suitable CEF Message Format may be employed. As many types and variants of event formats streaming from disparate devices makes integration a complex task, the arcsight standard for interoperability between various event- or log-generating devices may be defined in order to set up a common base. The Common Event Format (CEF) attempts to improve the interoperability of security products by aligning the logging messages.

CEF Uses Syslog as the transport layer, and after the mandatory CEF: prefix, the remainder of the message is formatted using a common prefix composed of fields delimited by a bar ("|") character.

Any subset of, and typically all of the following fields may be present:
CEF:versionldevice vendorldevice productldevice versionl- signature idlnamelseveritylextension Version is an integer and identifies the version of the CEF format.
Device Vendor, Device Product and Device Version are strings that uniquely identify the type Of sending device. In our case sepiosystemslsepioprimelversion.
Signature ID is a unique identifier per event-type. This can be a string or an integer. Signature ID identifies the type of event reported.
The specific Signature ids may be as detailed herein.
Name is a string representing a human-readable and understandable description of the event Severity is an integer and reflects the importance of the event. The values are between 0 to 10, where 10 indicates the most important event.

Extension can be a collection of key-value pairs. In some of the messages that will be detailed later in this document Extension field pair will be used.

An example for an Extension field is agentuuid=BFEBFBFF000506E364F0B74c.

A CEF Extension Dictionary may be provided since many types and/or variants of event formats may stream from disparate devices. The tables of FIGS. 13a-13b, all or any subset of which may be used, and within each table all rows and columns or any subset thereof may be provided, contain predefined keys that establish usages for both event producers and consumers. They display key names as well as full names for each key. It is the key name that is required in events.

The Security Suite is typically modular and may include plural threat oriented modules. Customers can decide to deploy and start with only some of the modules, while others can use all. A single Prime instance for example may support all the modules and they are enabled or disabled based on the specific installation license.

The threat oriented modules may include a USB Device Security module. This module typically has its own set of events e.g. All or any subset of the events described below. USB Device Security may be a functional module, that is used for detecting and monitoring the behavior of all the USB device assets in the organization. The USB Device Security typically provides full visibility of all connected devices and/or analyzes their capabilities and behavior in real time, and/or supports policy enforcement—thus allowing or blocking specific devices and interfaces e.g. According to a defined policy.

USB Device Security Messages may include all or any subset of the columns and rows of all or any subset of the tables of FIGS. 14a-18b e.g.

Sepio Agents New Agent Associated (FIG. 14a);
Agent Connected table of FIG. 14b;
Agent Disconnected table of FIG. 14c;
Agent Mode Changed to Free table of FIG. 15a;
Agent Mode Changed to Armed table of FIG. 15b;
Agent Peripherals Approved table of FIG. 15c;
New Peripheral Detected table of FIG. 16a;
Peripheral Connected table of FIG. 16b;
Peripheral Disconnected table of FIG. 16c;
Peripheral Approved table of FIG. 17a;
Peripheral Disapproved table of FIG. 17b;
Peripheral Enabled table of FIG. 18a; and
Peripheral Disabled table of FIG. 18b.

The following example incident clarifies advantages of embodiments shown and described herein:

An organization's internal documents were found to have leaked. There were no traces in the organization indicating how they could have been removed, and the network containing the stolen documents was believed to be air-gapped, so the documents could not have leaked through the Internet, and use of removable media was blocked without exception. This meant that the internal network was no longer air-gapped, so a malevolent actor or attacker could both leak information out and also infect the system, e.g. bring in ransomware or sabotage equipment. It turned out that at an unknown time, and probably as part of a larger shipment of computing equipment, an infected USB mouse was delivered to the organization's facility. The make and model of the mouse were identical to many other devices in the organization, and did not look different, hence did not raise any suspicions. USB peripheral devices were not being monitored as such, so it was not possible to trace when the infected device was first plugged into a computer. When plugged in, the infected device was detected by the host PC as a combination of a mouse and an HID keyboard—USB Class 3, Subclass 1, Protocol 1 (although a keyboard is an input device, there is a bidirectional communications channel (for controlling the CAPS and NUM lock LEDs for example) so data can also be leaked out, via a keyboard). Using keyboard emulation, the HID interface "typed" a PowerShell script, which built and executed the covert channel communication stack.

The infected mouse had a wireless interface, so it could be out-of-band operated and bypass the air-gap. The USB mouse was specifically crafted based on an original Microsoft model 1113 OEM mouse whose casing was opened, and a miniature USB hub (PCB level) was used for interconnecting the existing mouse circuitry and a malicious platform (Raspberry Pi Zero W board). The Raspberry Pi Zero W ensured not only a minimal current consumption easily supplied by the host PC being targeted, but also provided integrated WiFi functionality that could be used for remote control (C&C), initiating the attack and ex-filtrating the information out-of-band.

Similarly, such rogue devices have been found based not on WiFi communications, but on LoRaWAN (Wide area low power wireless network) modules for remotely communicating with the rogue peripheral.

When connected to the host PC, the "mouse" was detected as an ostensibly legitimate USB hub, to which both the mouse and the Raspberry Pi Zero W were connected. It is appreciated that many Penetration Testing images and utilities are available for Raspberry Pi, including keyboard emulators (e.g. rspiducky), traffic hijackers (e.g. PoisonTap), and complete backdoor full remote access implementations.

Embodiments shown and described herein may be used to identify such rogue hardware and upon identifying an instance of same, to trigger and alert and/or stop or disable the rogue device, thereby preventing breaches of security e.g. that described above. It is appreciated that identification of rogue hardware obviates costly, slow and often impossible physical examination, by human experts, of each and every one of the peripherals being used by each and every one of the end-stations in a networked system.

Another advantage is that the system herein may operate in parallel with existing security products which may be installed in the organization and which may include USB device control functionality (e.g. Symantec security product) together with other functionalities (say, antivirus).

It is appreciated that USB is merely one (prevalent) example of a generic port typically associated with an open standard or otherwise known interface but the teachings herein need not necessarily be limited to the USB use-case. Inter alia methods and systems shown and described herein may be applicable to formats which are not identical to a USB, but have relevant features in common with a USB.

It is appreciated that terminology such as "mandatory", "required", "need" and "must" refer to implementation choices made within the context of a particular implementation or application described herewithin for clarity and are not intended to be limiting, since, in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device, or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein, may be deployed in a cloud environment. Clients e.g. mobile communication devices such as smartphones, may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true, and never by determinations that x is false.

Features of the present invention, including operations, which are described in the context of separate embodiments, may also be provided in combination in a single embodiment. For example, a system embodiment is intended to include a corresponding process embodiment, and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A system for preventing attacks, on an organization having plural computers, via the computers' Universal Serial Bus (USB) ports, the system comprising:
    at least one processor configured to monitor at least one hardware aspect of a connection between a peripheral and a computer's USB port, to identify hardware aspects which match pre-configured criteria and, responsively, to take action,
        wherein the system stores descriptor sets, each including at least one descriptor, for known rogue devices and for known legitimate devices and identifies peripherals which have these descriptors, and
        wherein the system is updated by adding descriptor sets for new models or types of legitimate or rogue USB devices to system memory, when a Machine Learning (ML) based algorithm is able to classify a certain USB device as a legitimate non malicious device with a sufficiently high level of confidence,
    wherein, each time unknown descriptors are found not to match any known device, legitimate or rogue, thereby to define an unknown descriptor set, the unknown descriptor set is determined to be an unknown new model of a legitimate USB device each time the unknown descriptor set repeats for an over-threshold number of USB devices in the organization, and the system triggers action each time an under-threshold number of USB devices having an unknown descriptor set are found.

2. A system according to claim 1 wherein said at least one processor comprises
    a first processor configured to determine an ostensible identity of a peripheral connected to the computer via its USB port; and
    a second processor configured for comparing at least one aspect of the peripheral's operation with at least one known aspect of a peripheral having said ostensible identity.

3. A system according to claim 2 wherein said comparing includes detecting discrepancies between said aspects of the peripheral's operation and said known aspects of a peripheral having said ostensible identity.

4. A system according to claim 2 wherein the ostensible identity comprises a vendor ID and product ID provided by the peripheral to an operating system associated with the plural computers.

5. A system according to claim 1 wherein said at least one processor is configured to detect inputs injected via the USB port which are pre-defined to be indicative of a risk of an attack on the computer.

6. A system according to claim 5 wherein said inputs comprise typed references to utilities pre-defined to be indicative of a risk of an attack on the computer.

7. A system according to claim 1 wherein, on plural occasions, said action comprises initiating a test thereby to generate test results and, depending on the test's results, taking at least one further action in some of the plural occasions but not others, depending on the test results in each occasion.

8. A system according to claim 1 wherein the processor is further configured to monitor at least one interface aspect of the connection.

9. A system according to claim 1 wherein the processor is further configured to monitor at least one behavioral aspect of the connection.

10. A system according to claim 1 wherein said action is configurable, via a user interface, by a pre-designated security expert within a computerized network in which the computer is a node.

11. A system according to claim 2 wherein said action comprises provision of a notification alert to a pre-designated security expert within a computerized network in which the computer is a node.

12. A system according to claim 1 wherein said action comprises automatically disabling the USB port.

13. A system according to claim 2 wherein said known aspect comprises descriptors.

14. A system according to claim 11 wherein sets of descriptors characteristic of peripherals having a given make and model number are stored by the system.

15. A system according to claim 14 wherein at least one set of descriptors stored by the system is characteristic of a peripheral used for penetration testing and wherein the second processor is operative for identifying, as a pre-configured criteria suggestive of attacks, each peripheral whose descriptors correspond to the set of descriptors, stored by the system, which is characteristic of a peripheral used for penetration testing.

16. A system according to claim 14 wherein a pre-configured criteria suggestive of attacks includes peripherals whose descriptors do not correspond to any set of descriptors stored by the system.

17. A system according to claim 16 wherein the plural computers are nodes in a computerized network serving an organization and wherein the criteria does not include a set of predetermined size of peripherals with identical descriptors, even if those descriptors do not correspond to any set of descriptors stored by the system.

18. A system according to claim 12 wherein said automatically disabling comprises repeatedly sending, from the computer's operating system's kernel space, USB-port-disabling commands, each time period t where t is less than a duty cycle of USB-port enabling commands issued by the computer's operating system's user space.

19. A system according to claim 1 wherein hardware aspects are monitored, and then, via Machine Learning, anomalies in operational parameters are identified, by comparing:
   a. monitored operational parameters of an instance USB device being monitored, the USB device being of a given type, as defined by an ID by which peripherals during a handshake with a system's operating system identify their ostensible make and model to the system's operating system as part of said handshake, to
   b. population norms of the same or similar type which the system has accumulated, by Machine Learning, wherein devices which are not the same model or product but which share a single manufacturer or vendor are considered a similar type.

20. A method for preventing attacks of a Universal Serial Bus (USB) peripheral device on at least one computer from among plural computers, the method comprising:
   storing, in a computer storage data repository, at least one hardware aspect of at least one type of USB peripheral; and
   monitoring a connection between a peripheral instance and a computer's USB port, including using a processor configured for comparing aspects of the connection with said at least one aspect and taking action regarding at least one peripheral instance for which a result of said comparing suggests that the instance peripheral is attacking the computer,
   wherein, each time unknown descriptors are found not to match any known device, legitimate or rogue, the unknown descriptor set is determined to be an unknown new model of a legitimate USB device each time the unknown descriptor set repeats for an over-threshold number of USB devices in an organization, and the method triggers action each time an under-threshold number of USB devices having an unknown descriptor set are found, and
   wherein the method compares:
   a. monitored real time hardware operational parameters of an instance USB device which has defined itself to an operating system, as part of their handshake, as being of type T; to
   b. population norms, which the system has accumulated, for the hardware operational parameters of devices of type T.

21. A method according to claim 20 wherein each type of peripheral has a unique vendor ID and product ID and wherein the data repository stores at least one aspect of plural types of peripherals.

22. A method according to claim 21 wherein the aspect stored comprises descriptors characteristic of each type in the data repository and wherein action is taken for at least one instance peripheral which identifies itself as having vendor and product IDs characteristic of a type t, then provides an operating system associated with the plural computers with a descriptor which is not one of the descriptors stored in the data repository for the type t.

23. A method according to claim 21 wherein the aspect stored comprises interfaces characteristically requested by each type of peripheral in the data repository and wherein action is taken for at least one instance peripheral which identifies itself as having vendor and product IDs characteristic of a type t, then requests, from an operating system associated with the plural computers, an interface which is not one of the interfaces stored in the data repository for type t.

24. A method according to claim 21 wherein the at least one computer comprises a population of computers and wherein the method monitors and stores at least one operational parameter of peripherals connected to the population of computers and derives therefrom at least one expected level of said at least one operational parameter for each type of peripheral and wherein action is taken for at least one instance peripheral which identifies itself as having vendor and product IDs characteristic of a type t, but at least one of the instance peripheral's operational parameters, when monitored, deviates from the at least one expected level.

25. A method according to claim 24 wherein said operational parameter comprises the instant peripheral's current level.

26. A method for preventing attacks, on an organization having plural computers, via the computers' Universal Serial Bus (USB) ports, the method comprising:
   using at least one processor configured to monitor at least one hardware aspect of a connection between a peripheral and a computer's USB port, to identify hardware aspects which match pre-configured criteria and, responsively, to take action,
   including storing descriptor sets, each including at least one descriptor, for known rogue devices and for known legitimate devices thereby to accumulate population norms, and identifying peripherals which have these descriptors, and adding descriptor sets for new models or types of legitimate or rogue USB devices to system memory, when a Machine Learning (ML)based algorithm is able to classify a certain USB device as a legitimate non malicious device with a sufficiently high level of confidence, wherein the method compares:

a. monitored real time hardware operational parameters of an instance USB device which has defined itself to an operating system, as part of their handshake, as being of type T; to b. population norms, which the system has accumulated, for the hardware operational parameters of devices of type T, wherein, each time unknown descriptors are found not to match any known device, legitimate or rogue, thereby to define an unknown descriptor set, the unknown descriptor set is determined to be an unknown new model of a legitimate USB device each time the unknown descriptor set repeats for an over-threshold number of USB devices in the organization, and the method triggers action each time an under-threshold number of USB devices having an unknown descriptor set are found.

* * * * *